United States Patent
Luo

(10) Patent No.: US 7,057,158 B2
(45) Date of Patent: Jun. 6, 2006

(54) OPTICAL SUBASSEMBLY FOR HIGH SPEED OPTOELECTRONIC DEVICES

(75) Inventor: Xin Simon Luo, Monterey Park, CA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 0 days.

(21) Appl. No.: 10/162,480

(22) Filed: Jun. 4, 2002

(65) Prior Publication Data

US 2003/0010905 A1  Jan. 16, 2003

Related U.S. Application Data

(63) Continuation-in-part of application No. 09/904,091, filed on Jul. 12, 2001, now abandoned.

(51) Int. Cl.
*H01J 5/16* (2006.01)
(52) U.S. Cl. .................... 250/227.24; 385/15
(58) Field of Classification Search .......... 250/227.11, 250/227.24; 398/134, 141, 178, 200, 214; 385/15, 123
See application file for complete search history.

(56) References Cited

U.S. PATENT DOCUMENTS

| | | | | |
|---|---|---|---|---|
| 4,381,882 A | * | 5/1983 | Sabine | 385/77 |
| 4,693,552 A | * | 9/1987 | Jeskey | 385/116 |
| 5,311,005 A | | 5/1994 | Visocchi | |
| 5,347,601 A | * | 9/1994 | Ade et al. | 385/3 |
| 5,391,869 A | * | 2/1995 | Ade et al. | 250/227.24 |
| 5,734,765 A | * | 3/1998 | Artjushenko et al. | 385/31 |
| 6,081,638 A | * | 6/2000 | Zhou | 385/31 |
| 6,205,274 B1 | * | 3/2001 | Zhou | 385/38 |
| 6,521,989 B1 | * | 2/2003 | Zhou | 257/698 |

* cited by examiner

*Primary Examiner*—Stephone B. Allen
(74) *Attorney, Agent, or Firm*—Christie Parker & Hale

(57) ABSTRACT

A high speed interface for optoelectronic devices is disclosed that includes a housing adapted to receive a distal end of a fiber having a slanted end face. The end face of the fiber is optically coupled to an optoelectronic device mounted in the housing. The fiber cladding between the optoelectronic device and the fiber core may be polished or etched to reduce the thickness of the cladding to reduce the separation distance between the optoelectronic device and the slanted end face of the fiber. The reduced separation distance improves the optical coupling efficiency between the end face of the fiber and the optoelectronic device.

24 Claims, 18 Drawing Sheets

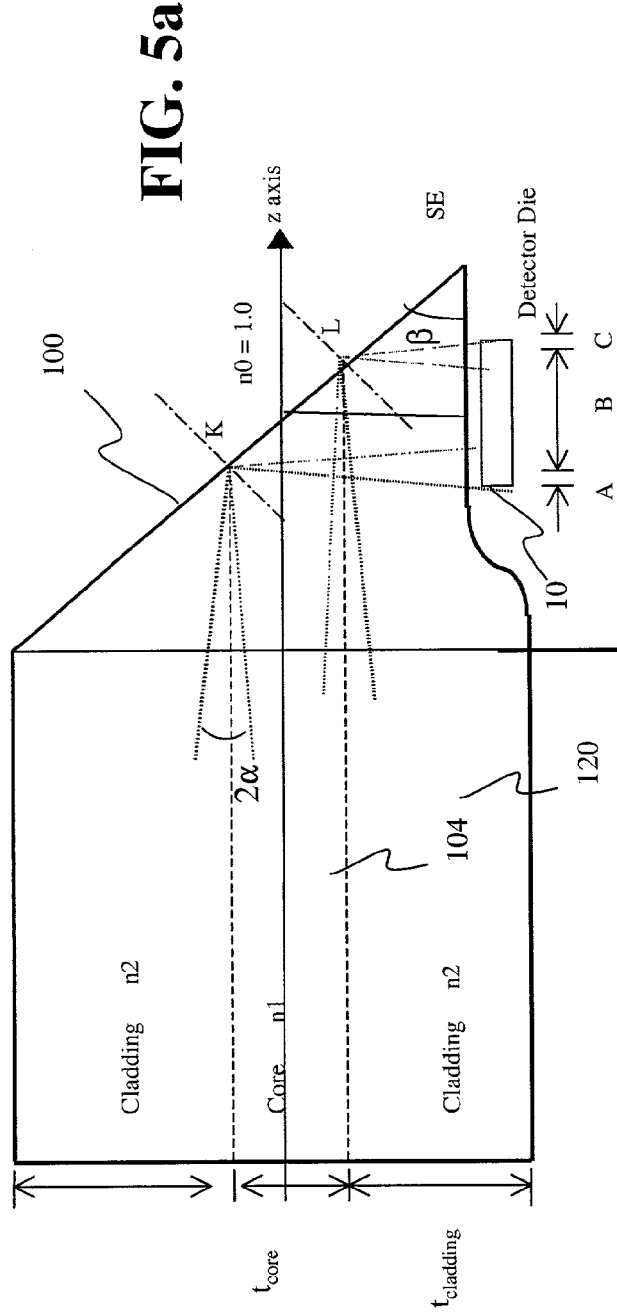
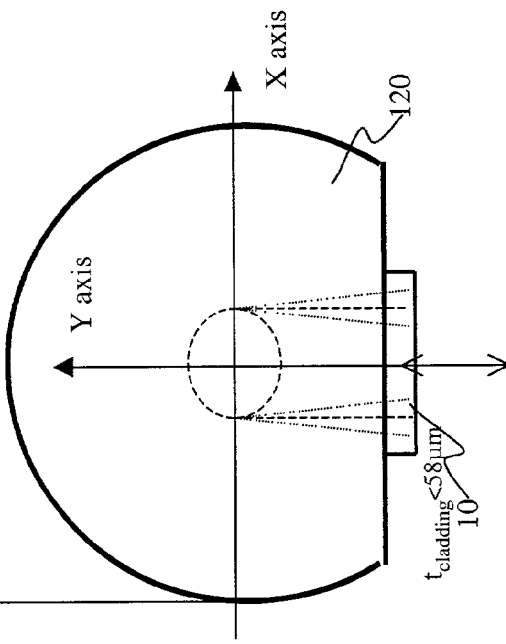
FIG. 5a
FIG. 5b

OPTICAL SUBASSEMBLY FOR HIGH SPEED OPTOELECTRONIC DEVICES

CROSS REFERENCE TO RELATED APPLICATION

This application is a continuation-in-part of U.S. patent application Ser. No. 09/904,091, entitled "HIGH SPEED FIBER TO PHOTODETECTOR INTERFACE", filed Jul. 12, 2001 now abandoned, the content of which is incorporated herein by reference.

FIELD OF THE INVENTION

The present invention generally relates to optoelectronic devices and more particularly relates to package assemblies for interfacing optoelectronic devices with optical fibers.

BACKGROUND

The proliferation of optical communication networks intended for subscribers has created a strong demand for low-cost and compact optical assemblies. The costs of an optical subassembly (OSA) increases with the number of components that combine to form the subassembly. In order to reduce the number of component parts of an optical assembly, attention has recently been directed to lensless, butt-coupling methods for interfacing an optoelectronic device and an optical waveguide. The precision of alignment that is required between the end of an optical waveguide, and an optoelectronic device varies with application.

For example, on the receiving side of an optical communication system, a received optical signal is opto-electrically converted into an electrical signal by a photodetector such as a photodiode, and information is reproduced according to the electrical signal obtained. Alignment difficulties on the receiver side of an optical communication system may therefore be introduced by characteristics of both the optical waveguide and the photodetector.

The alignment difficulty may generally be addressed by making a detector "artificially" larger than it needs to be, resulting in slower photodetectors with inherently larger rise times, fall times, and settling times. Larger photodetectors may therefore limit system level bandwidth which ultimately limits transmission data rates. The bandwidth of a photodetector is generally determined by the transit time of the photo-generated carriers in the absorption region and the RC time constant. The inherently lower bandwidth, for larger photodetectors, is caused by higher shunt resistance and larger shunt capacitance of the photo conductive areas of the detectors. More rapid response requires a smaller electrostatic capacitance at the depletion layer. The electrostatic capacitance decreases with decreasing depletion region area. Therefore, the diameter of the light receiving portion of high speed photodetectors are typically restricted to minimize the capacitance of the device.

However, optical beams emanating from an optical fiber typically have a relatively wide cross-sectional area that requires a wide depletion region. For example, the divergent beam size of existing fiber to photodetector interface assemblies that do not include focusing elements are typically on the order of about 25 μm, limiting their utility to data rates below about 10 Gbps.

Similarly, optoelectronic transmitters typically transmit a Gaussian beam whose beamwidth increases with distance from the transmitting device. The diameter of the incident beam (i.e. the transmitter output beam incident upon a fiber end face) therefore increases with increasing distance from the optoelectronic transmitter. Thus, the butt coupling efficiency between an optoelectronic transmitter and a slant ended fiber decreases with increasing separation distance between the end face of the fiber core and the optoelectronic device.

SUMMARY OF THE INVENTION

In an exemplary embodiment of the present invention, an optoelectronic subassembly includes an optical fiber formed from a fiber cladding having a first thickness surrounding a fiber core and an optoelectronic device optically coupled to a distal end of said optical fiber, wherein the distal end comprises a slanted end face and wherein a portion of the fiber cladding between the optoelectronic device and the fiber core has a second thickness less than the first thickness to allow the optoelectronic device to be more closely coupled to the slanted end face.

In another aspect of the present invention an optoelectronic subassembly includes a plurality of optical fibers, wherein each of the optical fibers has a fiber cladding having a first thickness surrounding a fiber core and a plurality of optoelectronic devices, wherein each of the plurality of optoelectronic devices is optically coupled to a distal end of a unique one of the plurality of optical fibers, wherein each of the plurality of distal fiber ends comprises a slanted end face and wherein a portion of the fiber cladding between each of the plurality of optoelectronic devices and the plurality of fiber cores has a second thickness less than the first thickness.

It is understood that other embodiments of the present invention will become readily apparent to those skilled in the art from the following detailed description, wherein it is shown and described embodiments of the invention by way of illustration of the best modes contemplated for carrying out the invention. As it will be realized, the invention is capable of other and different embodiments and the details are capable of modification in various other respects, all without departing from the spirit and scope of the present invention. Accordingly, the drawings and detailed description are to be illustrative in nature and not restrictive.

BRIEF DESCRIPTION OF THE DRAWINGS

These and other features, aspects, and advantages of the present invention will become better understood with regard to the following description, appended claims, and accompanying drawings, in which:

FIG. 5a is a cross section of a fiber to photodetector interface wherein a portion of cladding material on exiting light side of the slanted end face has reduced thickness to allow the photodetector to be more closely coupled to core of said fiber in accordance with an exemplary embodiment of the present invention;

FIG. 5b is an end view of the fiber to photodetector interface of FIG. 5a illustrating the portion of cladding material on exiting light side of the slanted end face has reduced thickness in accordance with an exemplary embodiment of the present invention;

DETAILED DESCRIPTION OF THE INVENTION

An exemplary embodiment of the present invention provides an apparatus and method for interfacing a high speed photodetector with an optical fiber. In order to appreciate the advantages of the present invention, it will be beneficial to describe the invention in the context of an exemplary optical receiver module.

Figure 1:
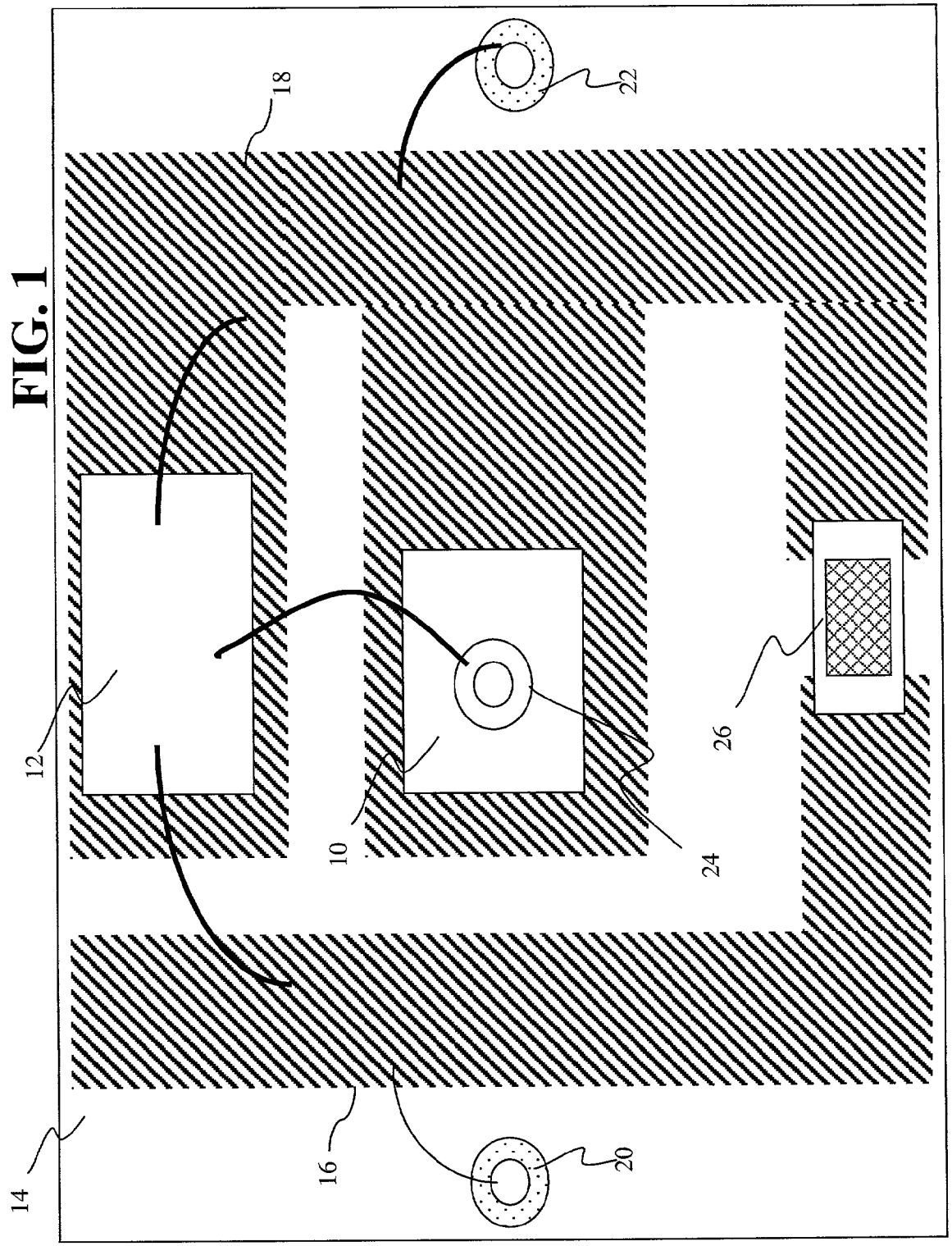
FIG. 1 is a plan view of an exemplary optical receiver having a photodetector and transimpedance amplifier coupled to a circuit board in accordance with an exemplary embodiment of the present invention.

Referring to FIG. 1, an exemplary optical receiver module may include a photodetector 10 and a transimpedance amplifier (TIA) 12 mounted on a circuit board 14. The described exemplary optical receiver module may further include a housing for receiving an optical fiber lying parallel to the circuit board (see FIG. 3). In an exemplary embodiment the photodetector 10 may be planar having a first surface oriented to receive light normal to the longitudinal axis defined by the fiber core. A source (power supply) pattern 16 and a ground pattern 18 may also be formed on the circuit board 14. The source (power supply) pattern 16 may be coupled to a source microstrip 20. The ground pattern 18 may be coupled to a ground microstrip 22.

In the described exemplary embodiment, an annular ohmic contact 24, formed on an upper surface of the photodiode 10, may be coupled to an input terminal of the TIA 12 via conventional wire bonding techniques. Wire bonds may be formed from aluminum or gold, with small alloying additions to achieve the desired handling strength.

The wire bonds between the photodetector and the transimpedance amplifier may introduce a parasitic inductance that tends to reflect the signal generated by the photodetector back to the photodetector. The inductance generally increases with increasing wire length. Therefore, in one embodiment an interconnect metal (not shown) may be formed and patterned on an upper surface of the photodetector. The low resistance metalization layer may extend away from the annular ohmic contact to form a coplanar contact pad (not shown). The contact pad is preferably located so as to reduce the length of the wirebond coupling between the photodetector and transimpedance amplifier.

In operation, when the light beam is incident on the light receiving area of the photodetector, electron-hole pairs are generated. A bias voltage is applied across the ohmic contacts so that electrons and holes are moved by a bias electric field to bring about a flow of electric current having an intensity proportional to the intensity of the incident light. The output current signal of the photodetector may be coupled to an input of the transimpedance amplifier. The transimpedance amplifier converts the current signal to an output voltage signal.

An exemplary optical receiver module may further include a capacitor 26 coupled between the source pattern 16 and the ground pattern 18. The capacitor 26 shunts transients past internal receiver components that may be damaged by high voltages. In addition, the external capacitor substantially reduces the effects of transient noise on the output signal.

Figure 2:
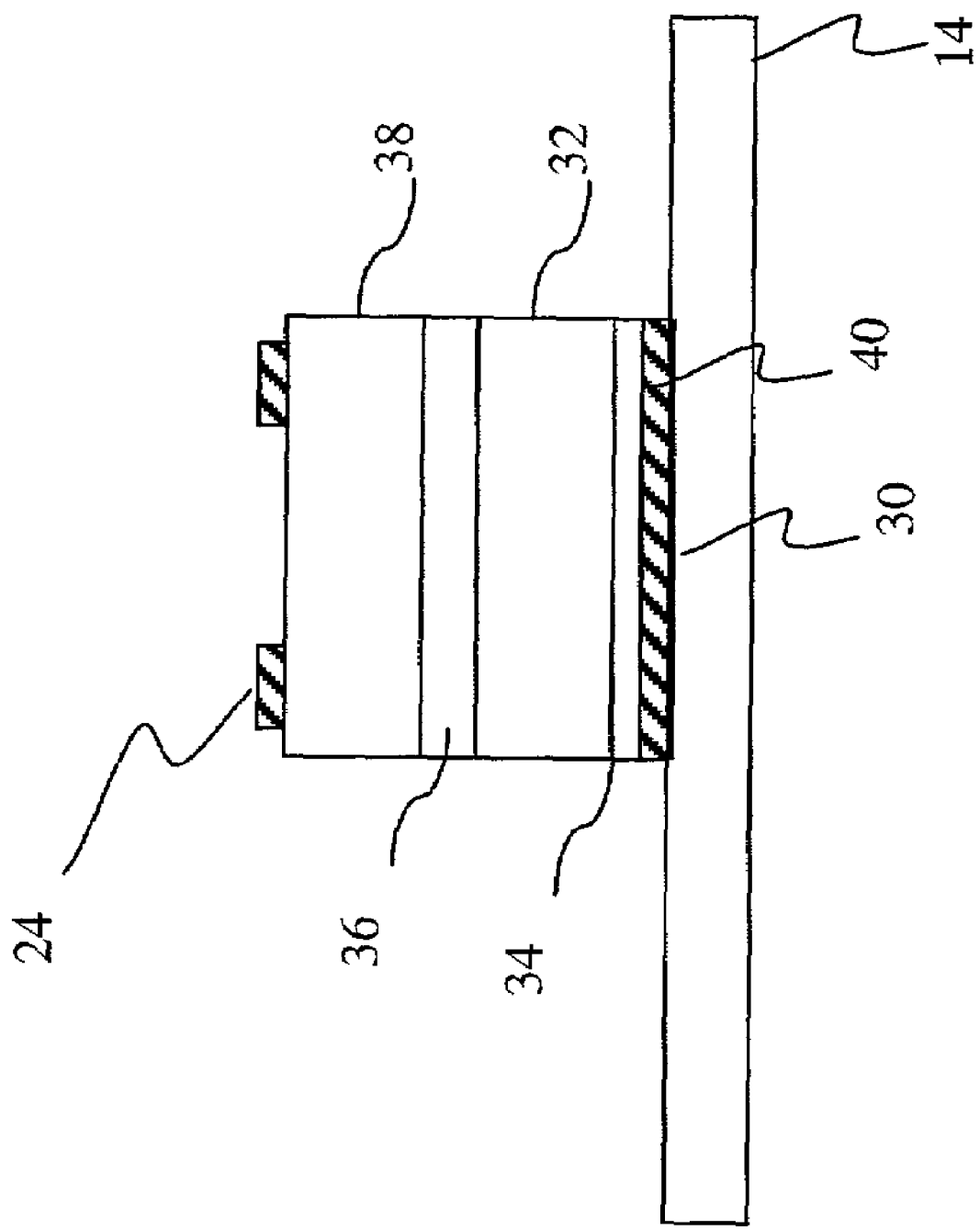
FIG. 2 is cross section of the photodetector coupled to the circuit of FIG. 1 in accordance with an exemplary embodiment of the present invention.

Referring to the cross section of FIG. 2, the photodetector 10 may be coupled to the circuit board 14 by a connection layer 30. The connection layer 30 may be formed from thermoplastic adhesive or solder. In the described exemplary embodiment, a lower side ohmic contact is coupled to a titanium, platinum, gold, etc. contact pad on the circuit board 14. The photodetector in the described exemplary embodiment may comprise a top side illuminated p-i-n photodiode. Therefore, the lower n-type ohmic and contact pad may be coupled to the ground pattern on the circuit board. For this embodiment, it is assumed that the cathode of the photodetector is grounded. Therefore, the photodetector is energized by applying a positive signal to the photodetector. However, it is to be understood that photodetectors can also be packaged with the anode grounded, in which case a negative signal is applied to the module to energize the photodetector.

In the described exemplary embodiment, an n-type layer 32 is epitaxially grown on an n-type semiconductor substrate 34. The n-type layer 32 is preferably lattice-matched to the substrate 34 and any intervening layers. In an exemplary embodiment, the n-type layer 32 may be formed of InP. The n-type layer 32 may be doped with a suitable dopant, such as, for example, sulfur.

An active absorber region 36 that is absorptive at the wavelength of interest may be epitaxially formed on the n-type layer 32. The active absorber 36 may be formed from InGaAs or other suitable materials known in the art. In an exemplary embodiment a p-type layer 38 is formed on the active absorber layer 36 from InP. The p-type layer may be doped with a suitable dopant such as Zinc.

To electrically contact the photodetector p-type and n-type ohmic contacts 24 and 40 are preferably deposited above the p-type region 38 and below the substrate 34 respectively. The p-type ohmic contact (also referred to as the annular ohmic contact) may be formed, for example, by depositing a p-type metalization, such as gold with 2% beryllium added or a layered structure of titanium/platinum/gold above the p-type layer, defining an annular opening therein by a lithographic masking and lift-off process. The p-type ohmic contact 24 may be deposited by electron beam evaporation. In one embodiment the n-type ohmic contact 24 may be formed, for example, by depositing an n-type metalization such as AuGe/Ni/Au on a lower surface of the substrate.

One of skill in the art will appreciate that the present invention is not limited to a particular photodetector. Rather the present invention may be utilized with a variety of photodetectors known in the art, such as, for example, a metal-semiconductor-metal (MSM) photodetector or an avalanche photodiode. Further, the photodetector may be formed from a plurality of group III–V compound semiconductors, such as, for example, GaAs/AlGaAs, InGaAs/AlGaAs or InP/InGaAsP or other direct bandgap semiconductor materials. Therefore, the disclosed exemplary p-i-n photodiode embodiment is simply by way of example and not by way of limitation.

Figure 3:
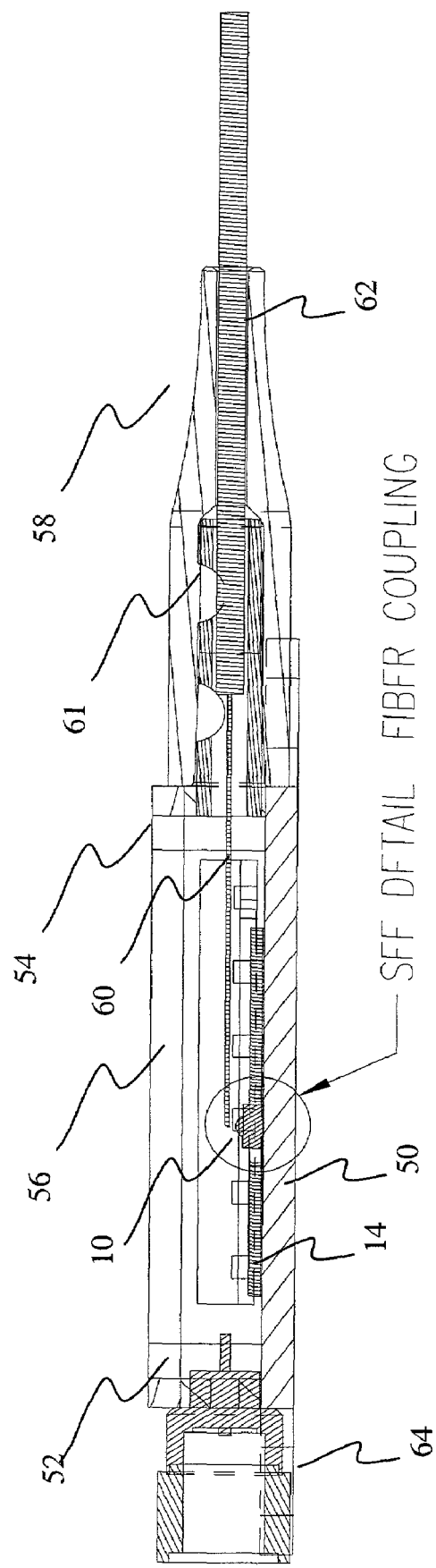
FIG. 3 is a cross section wherein the circuit board of FIG. 1 is mounted in a metallic housing comprising a bottom plate with four side walls) and a top close out plate in accordance with an exemplary embodiment of the present invention.

Referring to the cross section of FIG. 3, an exemplary optical receiver may further include a metallic housing comprising a bottom plate 50 with four side walls (two shown 52 and 54) and a top close out plate 56. In the described exemplary embodiment the circuit board 14 may be mounted onto the bottom plate 50 of the housing with a conductive epoxy and connection wires may be coupled to the input power leads as required.

An exemplary housing may further include a sleeve 58 for receiving a distal end 60 of a fiber. In one embodiment a portion 62 of the fiber may be metallized and soldered to a connector 61 that is coupled to the housing within the sleeve 58 to allow the photodetector to be hermetically sealed. Further, the distal end 60 of the optical fiber may be epoxied to the circuit board 14 so that the distal end is aligned with the photodetector 10 in a manner that maximizes the amount of light coupled between the optical fiber and the photodetector. As is known in the art, the optical fiber and photodetector may be actively aligned through a series of adjustment steps. In addition, a coaxial cable 64 or differential voltage leads may provide an output from the optical receiver.

Figure 4:
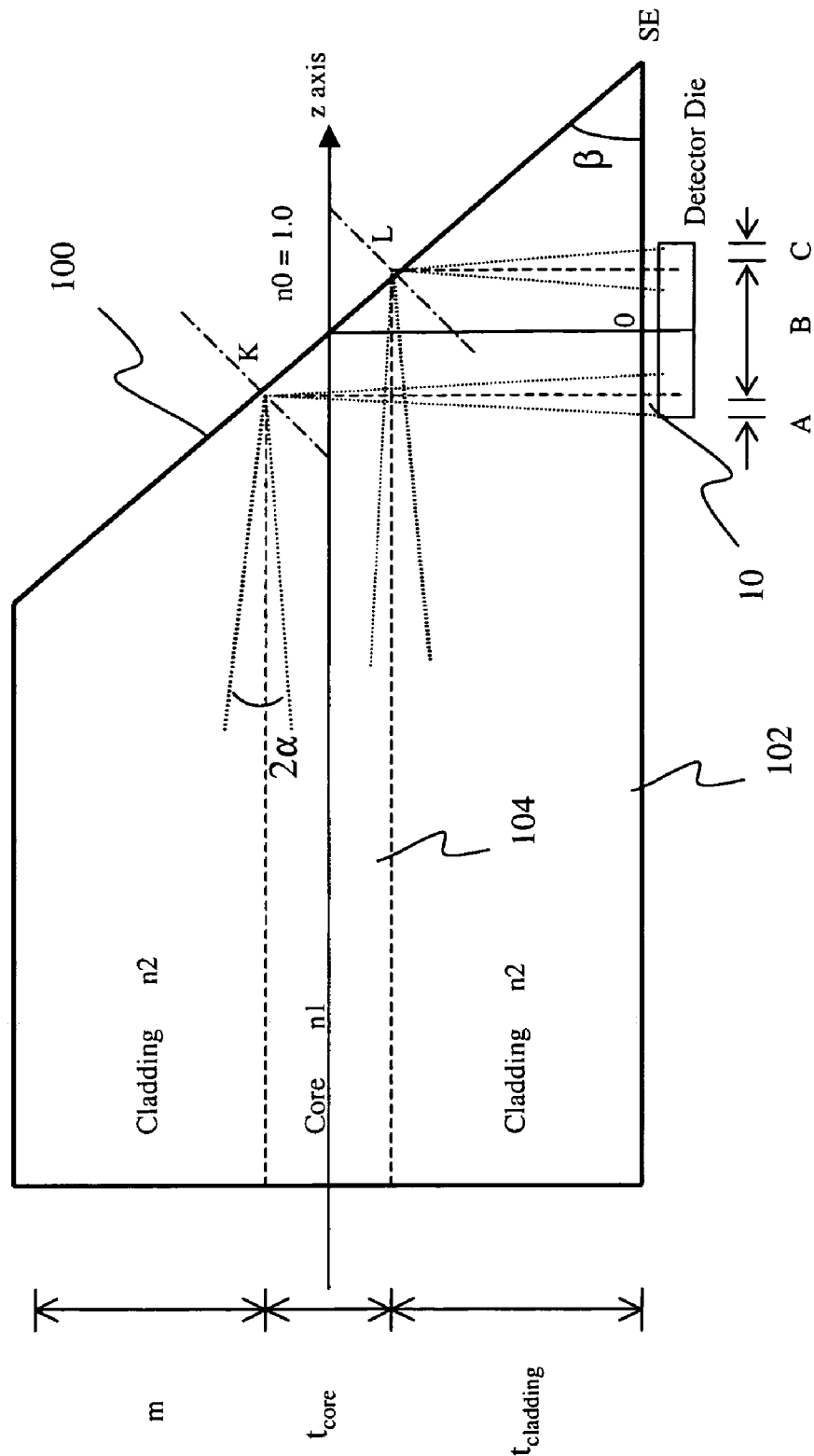
FIG. 4 is a cross section of a conventional fiber to photodetector interface.

The cross section of FIG. 4 illustrates a conventional lens free interface between a photodetector and a fiber (such as, for example, a SMF-28 fiber). An end face 100 of a distal end of optical fiber 102 is non-perpendicular to the longitudinal axis defined by the fiber core 104. That is to say, the end face 100 of the optical fiber 102 is slanted. As is known in the art the end face of the fiber may be cleaved or polished to provide a desired end face angle. The angle of the end face of the fiber ($\alpha$) is preferably large enough to ensure that reflected light is not confined within the fiber and does not propagate back through the cladding toward the transmitter, but is instead directed toward the photodetector 10. For a typical fiber, the angle of the fiber end face is preferably greater than about eight degrees to provide an optical return loss of less than about −55 dB.

In the described exemplary embodiment the end face of the fiber is slanted at an angle that is less than the critical angle for total internal reflection and is preferably in the range of about 40–55 degrees. Reflections off the end face of the fiber create a divergent reflected beam whose width increases with increasing distance from the slanted end face 100 of the fiber. For efficient optical coupling, the diameter of the light receiving portion or active area of the photodetector is preferably equal to or greater than the diameter of the incident beam. Therefore, for efficient optical coupling, the diameter of the light receiving portion or active area of the photodetector must also increase with increasing separation between the photodetector and the fiber core or end face.

The beam divergence is bounded in large part by the maximum angle captured by the core as defined by the critical angle. Rays traveling at an angle less than the critical angle (see Eq. 1 below) are totally internally reflected and guided by the fiber.

$$\alpha = \cos^{-1}(n_{cladding}/n_{core}) \quad \text{(Eq.1)}$$

Higher angle rays, on the other hand enter the cladding and are lost due to high levels of scattering and absorption. For example for a SMF-28 fiber having a cladding refractive index ($n_{cladding}$ 1.604) and a core refractive index ($n_{core}$ 1.6105) the critical angle is on the order of about 4.98 degrees.

Referring again to FIG. 4, simple ray tracing or geometrical optics techniques may be used to approximate the diameter (A+B+C) of a photodetector as a function of the separation between the fiber core and photodetector, as largely determined by the cladding thickness ($t_{cladding}$). For example, for an end face slant angle $\alpha=45°$, and a core thickness ($t_{core}$) of 9 µm (e.g. SMF-28 fiber) the width B is also equal to 9 µm. In addition, for $t_{cladding}=58$ µm for a SMF-28 fiber the width A may be approximated by:

$$(t_{cladding}+t_{core})/\tan\{180-(\beta+\alpha)-\beta\} \quad \text{(Eq. 2)}$$

5.84647 µm and the width C may be approximated by:

$$(t_{cladding})/\tan\{180-(\beta+\alpha)-\beta\} \quad \text{(Eq. 3)}$$

5.06112 µm

Thus, a photodetector diameter of approximately 19.9075 µm is required for a cladding thickness of 58 µm. In operation the beam size will be slightly larger (approximately 4/Π or 1.27 times this diameter) due to the Gaussian distribution of the beam. Therefore, a photodetector diameter of approximately 25.28 µm may be required for a cladding thickness of 58 µm.

Referring to the cross section and end views of FIGS. 5(a&b) respectively, in an exemplary embodiment of the present invention the cladding material on the exiting light side 120 of the sloped fiber end face may be polished, laser ablated or chemically etched to reduce the thickness of the cladding material. The reduced cladding thickness allows the photodetector to be more closely coupled to the fiber core which reduces the beamwidth of the divergent beam that is incident on the photodetector.

Figure 6:
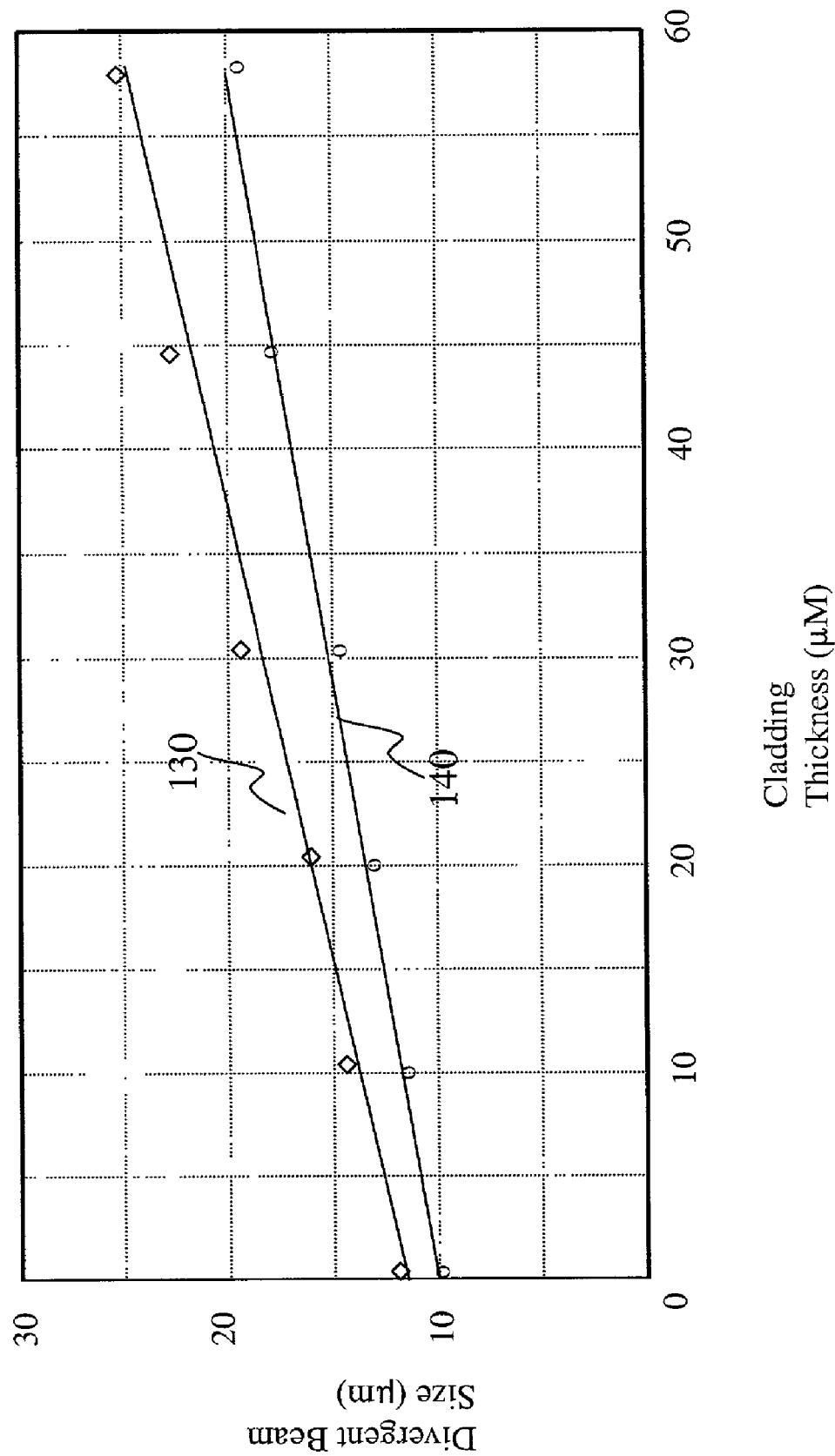
FIG. 6 graphically characterizes the beamwidth versus cladding thickness for the fiber to photodetector interface of FIG. 5a in accordance with an exemplary embodiment of the present invention.

FIG. 6 graphically illustrates the divergent beam size as a function of cladding thickness. Calculations for a geometrical beam size based on ray optics 130 as well as a distributed beam size 140 that accounts for the Gaussian distribution of the beam are included. The divergent beam size and the corresponding photodetector diameter may be reduced by approximately 50% from a diameter of approximately 25.28 µm to 12.65 µm if the cladding thickness is reduced from a standard thickness of 58 µm to 1 µm.

Figure 7:
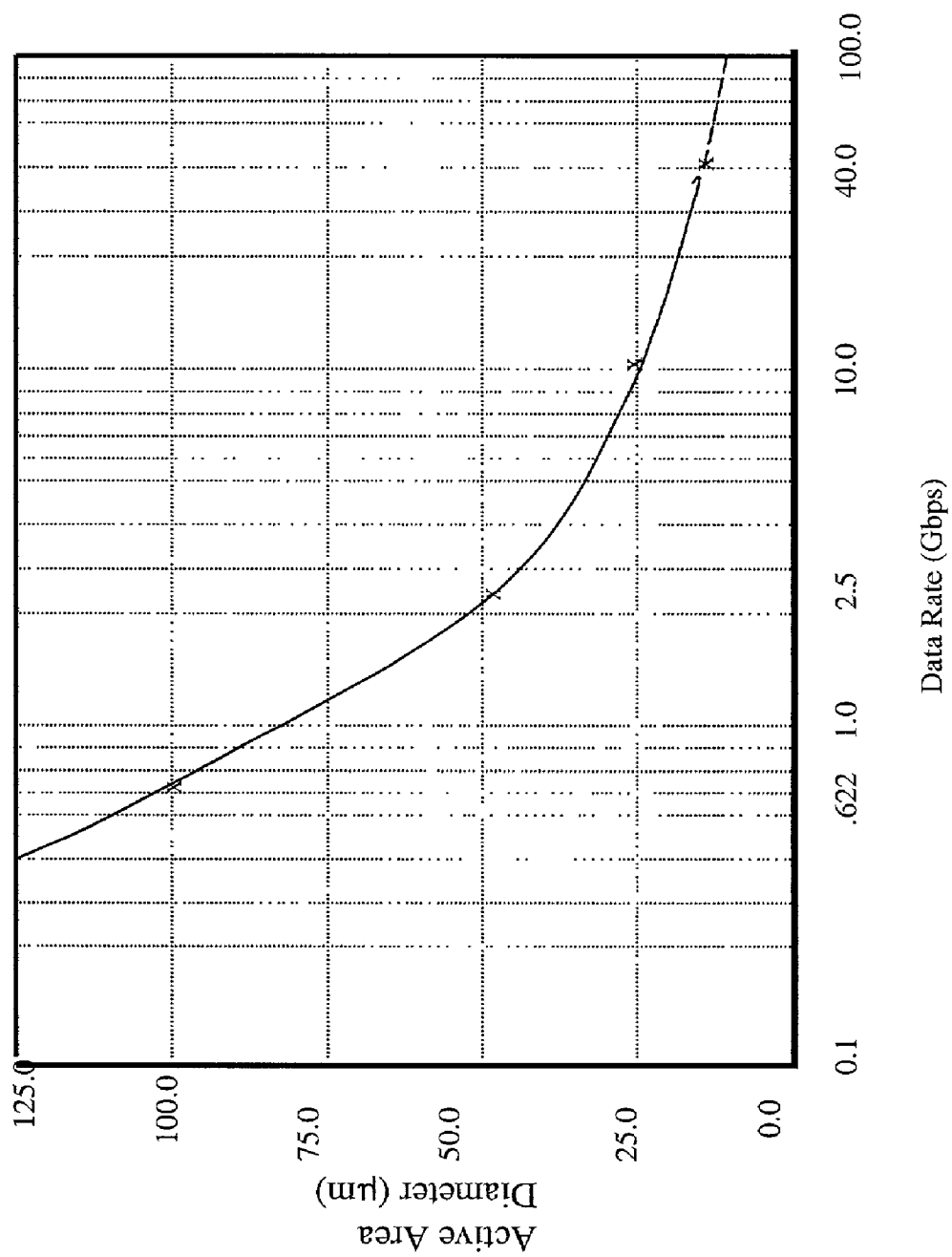
FIG. 7 graphically illustrates the typical operation data rate of an photodetector as a function of diameter of photodetector active area.

FIG. 7 graphically illustrates an approximate relation between data rate and the diameter of the active area of a photodetector as limited by the capacitance of the photodetector. The described exemplary fiber to photodetector interface having a cladding thickness of approximately 1 µm may be used in existing optical receiver designs up to a data rate of about 40 Gbps when the diameter of the active area is reduced to approximately 12.5 µm.

Although an exemplary embodiment of the present invention has been described, it should not be construed to limit the scope of the appended claims. For example, the described exemplary fiber to photodetector interface may be utilized in a plastic encapsulated optical receiver rather than the hermetically sealed receiver described herein. Further, those skilled in the art will understand that further modifications may be made to the described embodiment.

Figure 8:
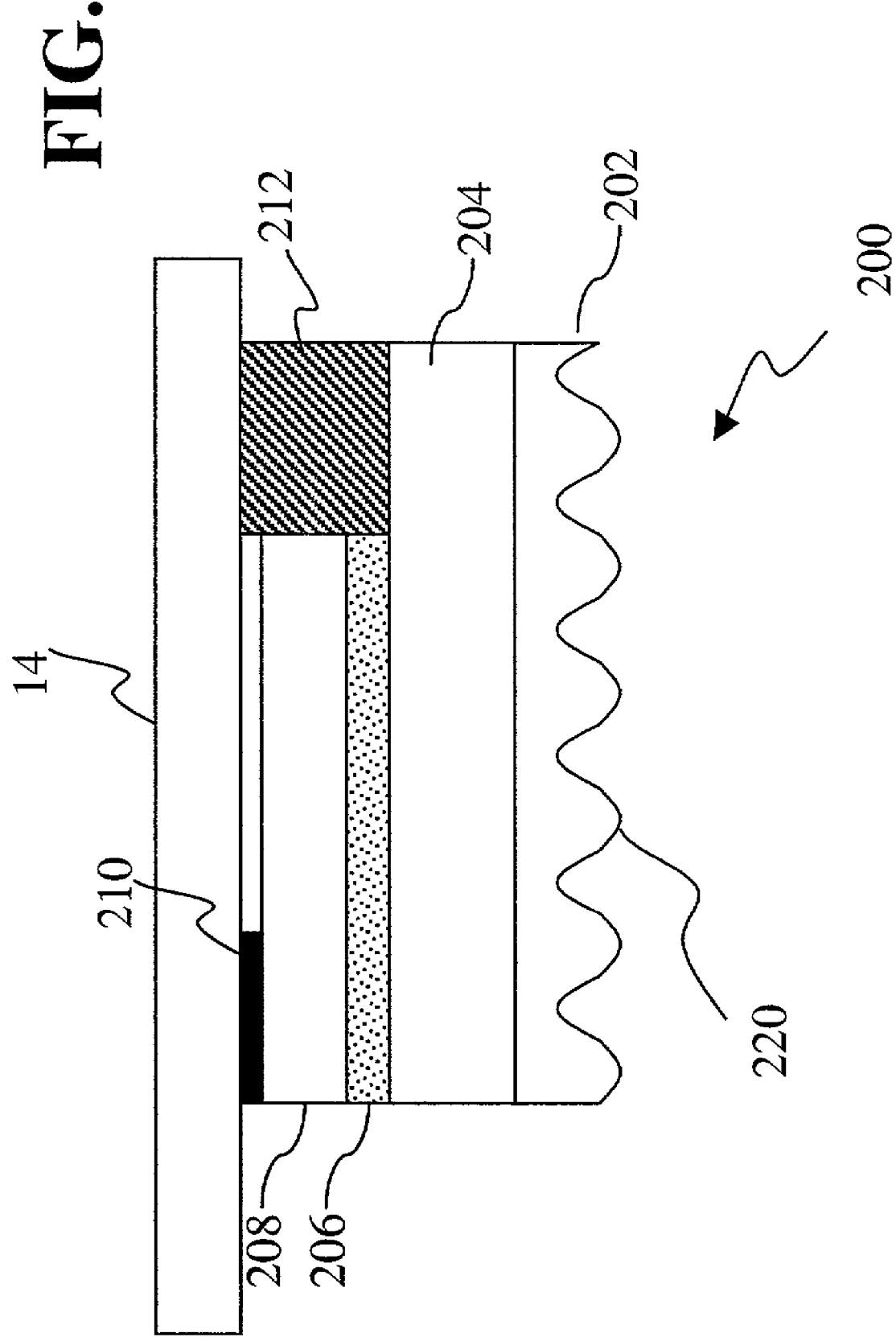
FIG. 8 is a cross section of a photodetector flip chip mounted to a circuit for use in a backside illuminated fiber to photodetector interface in accordance with an exemplary embodiment of the present invention.

For example, the described exemplary fiber to photodetector interface may be used with backside illuminated photodetectors. Referring to FIG. 8, in an alternate embodiment, photodiode 200 may be flip chip mounted to the circuit board 14 as is known in the art. In an exemplary backside illumination embodiment, an n-type layer 204 may again be epitaxially grown on an n-type semiconductor substrate 202. The n-type layer 204 is preferably lattice-matched to the substrate 202 and any intervening layers. In an exemplary embodiment, the n-type layer 204 may be formed of InP and may be doped with a suitable dopant, such as, for example, sulfur.

An active absorber region 206 that is absorptive at the wavelength of interest may be epitaxially formed on the n-type layer 204. The active absorber 206 may be formed from InGaAs or other suitable materials known in the art. In an exemplary embodiment a p-type layer 208 is formed on the active absorber layer 206 from InP. The p-type layer may be doped with a suitable dopant such as Zinc.

However, in the backside illumination embodiment, a received signal is incident upon the substrate. In this embodiment, the incident light may further diverge as it propagates through the substrate, thereby requiring a larger diameter device to efficiently receive a particular incident beamwidth. Therefore, in an exemplary backside illuminated embodiment, the substrate may be processed to include focusing elements 220 to focus the incident light through the substrate. In one embodiment the focusing elements 220 may be formed by etching approximately 75 µm to 100 µm radii into the substrate. A wet or preferably a dry etching process such as, for example, reactive ion etching (RIE), reactive ion beam etching (RIBE), or the like, may be used to form the focusing elements.

In the described exemplary embodiment, photodiode 200 may include top side p-type and n-type contacts 210 and 212 that may be used to reverse bias the active absorber layer 206. The p-type contact 210 may be deposited on the upper surface of the p-type layer 208. The p-type contact 210 may be, for example, a gold/zinc (Au/Zn) alloy. The p-type contact may be deposited by electron beam evaporation or other techniques known in the art. In one embodiment the p-type layer 208 and active absorber layer 206 may be etched, defining an annular opening therein, to expose the upper surface of the n-type layer 204. The n-type contact 212, formed from a metallization such as, for example, Au/Zn, may be deposited on an upper surface of the n-type layer 204 by a lithographic mask and lift-off process. The completed photodiode may be flip chipped mounted to the circuit board 14 as is known in the art.

Figure 9:
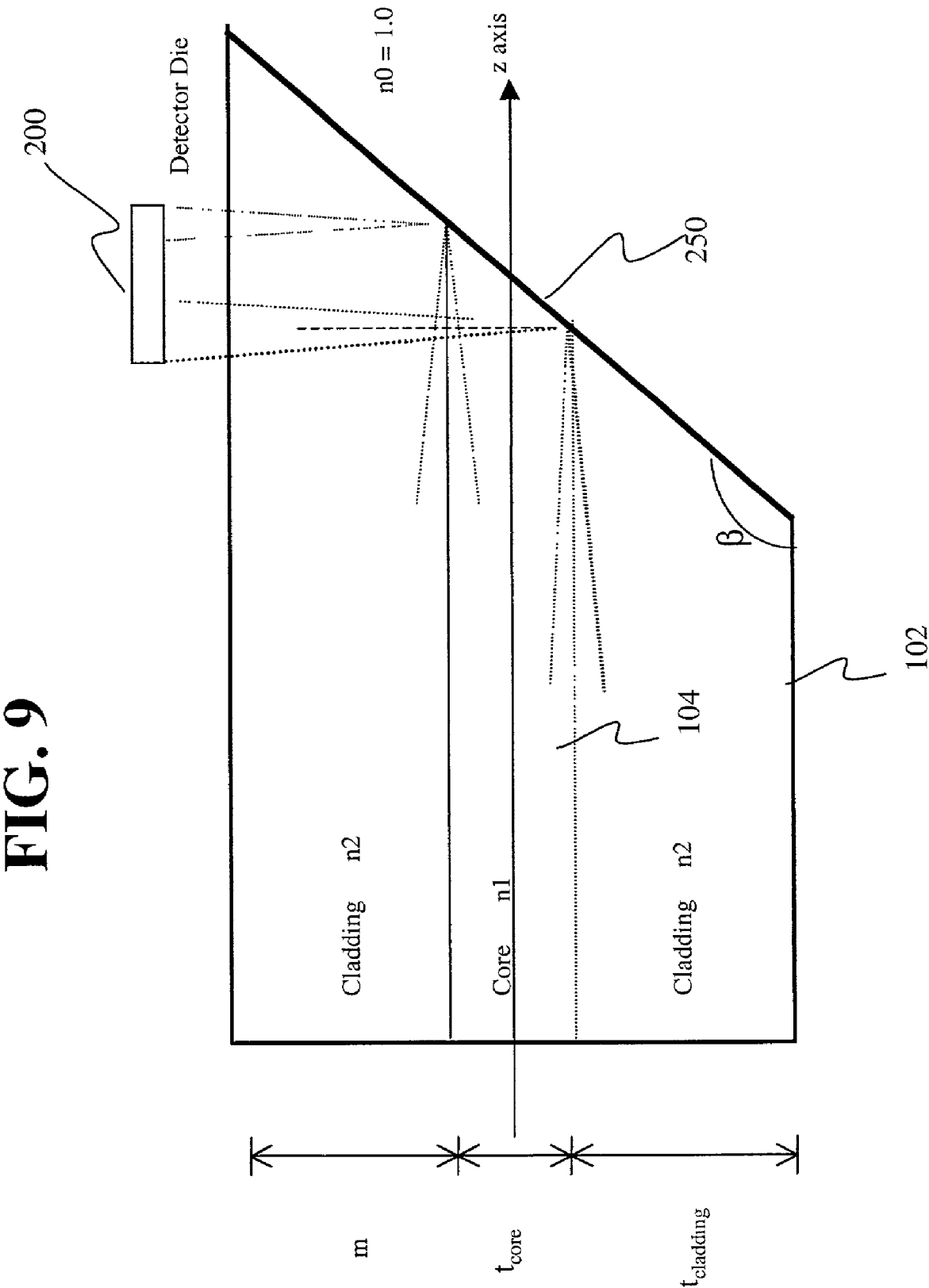
FIG. 9 is a cross sectional of an exemplary fiber interface for the backside illuminated photodetector of FIG. 8 in accordance with an exemplary embodiment of the present invention.

Referring to the cross section of FIG. 9, a backside illuminated fiber to photodetector interface incorporating a flip chip mounted photodetector 200 of FIG. 8 utilizes an end face slant angle in the range of about 135–145 degrees. The cladding thickness in the optical path between the photodetector and fiber end face may again be reduced to reduce the separation therebetween. The flip chip mounted photodetector may then be used in top mounted photodetector designs as is known in the art.

Figure 10:
FIG. 10 is an exemplary process for designing a high speed optical interface in accordance with an exemplary embodiment of the present invention.

An exemplary process for designing a high speed optical interface is illustrated in the flow chart of FIG. 10. In accordance with an exemplary design method, a user may determine fiber parameters 300 such as for example, the index of refraction of the core and cladding. In accordance with an exemplary process, a suitable slant angle in step 302 may then be selected to be less than the critical angle for an end face to air interface determined in accordance with the fiber parameters defined in step 300. A suitable active area diameter for receiving an optical signal having a predetermined data rate may then be determined in step 304. The diameter of the active area of the photodetector may then be used to determine the separation distance between the fiber end face and the photodetector in step 306.

In one embodiment the separation distance may be chosen so that the active area diameter of the photodetector is substantially equal to or greater than the beamwidth of the divergent beam reflected off the slanted end face of the fiber. The divergent beamwidth may be determined in accordance with the fiber parameters and slant angle of the fiber end face as taught with respect to FIG. 6. The separation distance may then be used to determine the thickness of the fiber cladding material on the exiting light side of the slanted end face in step 308. The fiber may then be polished to reduce the cladding thickness as required in step 310.

Figure 11:
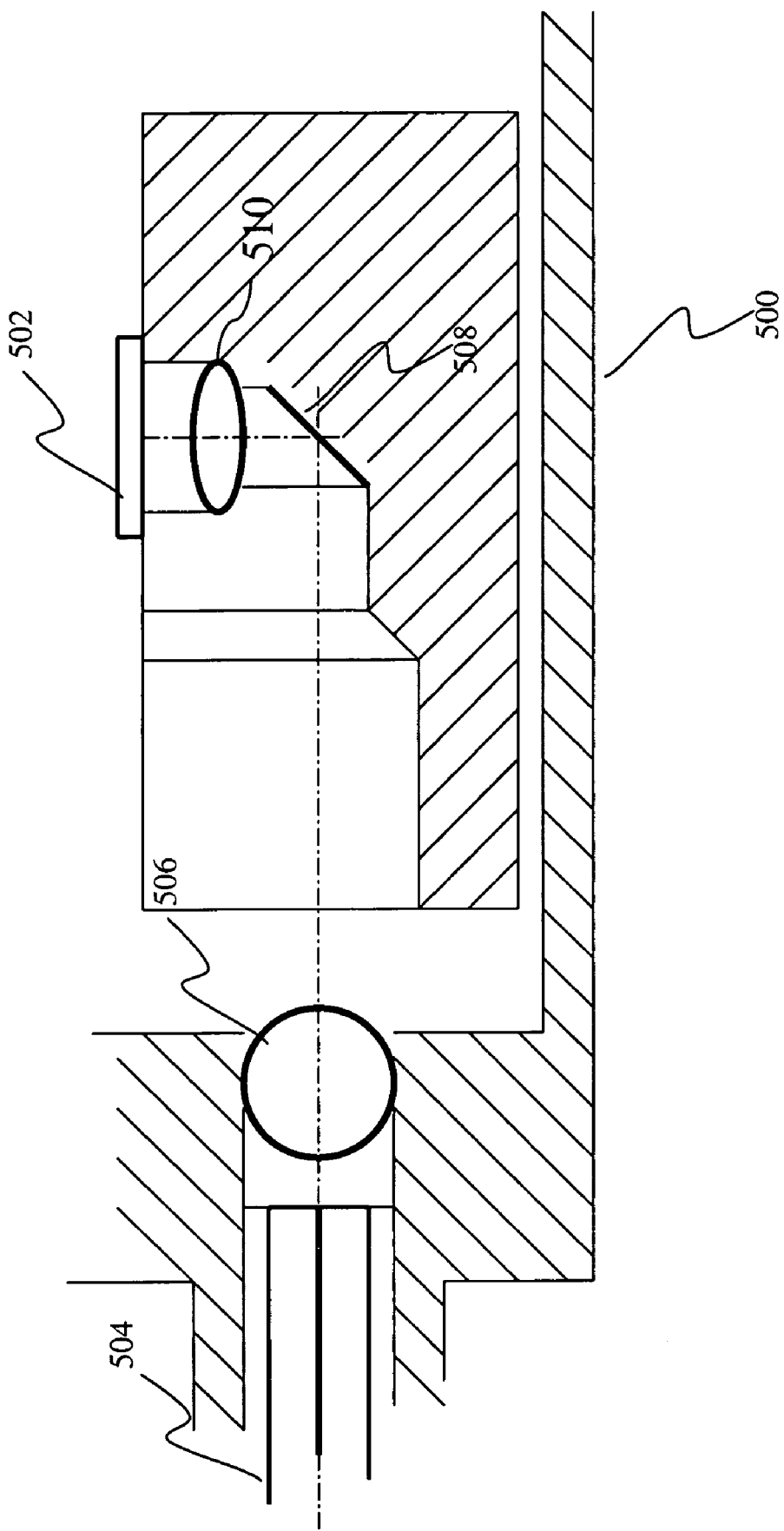
FIG. 11 is a cross section of a conventional fiber to photodetector interface including a focusing system having multiple lenses for imaging the end face of the fiber onto the photodetector.

One of skill in the art will appreciate that there currently exists many design variations for high speed optoelectronic receivers. For example, FIG. 11 illustrates a conventional optical receiver housing 500 having a cavity for receiving a photodetector 502. An optical fiber 504 passes through a small hole in the housing 500. The hole is typically sealed around the optical fiber segment to ensure that the housing is hermetically sealed. To provide sufficient coupling efficiency a conventional package may utilize one or more optical lenses to interface an optical fiber to a photodetector.

For example, a typical optical lens system may utilize a ball lens 506 to focus light exiting from the end face of a single mode optical fiber 502 onto a reflecting surface 508. The reflecting surface 508 reflects the received light onto a second lens 510 that focuses a convergent beam onto a vertically mounted photodetector 502. Reliable high speed optical communication requires accurate optical alignment (i.e. efficient light coupling) between each of the elements in the focusing system as well as efficient conversion of photons to electrons.

In addition, for efficient light coupling the optical image of the fiber end face should be closely centered with the photodetector active area. However, in conventional focusing systems, the relative distance between the end face of the fiber (i.e. the object) and the primary focal plane of the sphere will affect both the location at which the image is formed as well as the lateral magnification or size of the image. Therefore, the assembly distance between the end face of the optical fiber and the focal plane of the ball lens as well as the optical alignment between the components of the focusing system must be tightly controlled for efficient optical coupling between the fiber and the photodetector.

To maintain proper alignment the optical fiber is generally secured at a point inside the housing in addition to being secured by the seal at the hole in the housing. In operation differential expansion of the fiber segment and the housing due to temperature shifts or mishandling of the housing may cause breakage of the fiber segment and or misalignment between the fiber and the photodetector.

In addition, device responsivity may be degraded by the imaging processes itself. In a perfect imaging process the principle of the reversibility of light requires that any object placed at a position previously occupied by its image will be imaged at the position previously occupied by that object. The object and the image are thus said to be interchangeable or conjugates. In this case, the edge of the physical beam image may be very sharp and its size can match the effective active area of the photodetector.

However departures from the ideal case may give rise to defects in the image known as aberrations. Lens aberration and mis-alignments in the imaging system may result in non-uniform illumination of the active area of the photodetector as well as variations in the size of the image that may result in mismatches between the size of the image and the active area of the device. Such non-uniform illumination of the active area and mismatches between the size of the active area and the size of the image may degrade the responsivity of the device.

For example, there may be some variation in the sensitivity of a photodetector as a function of the position of the incident light in the active area. For example, the light sensitivity of a photodetector may degrade near the periphery of the active area of the device as compared to the center of the active area. In addition, the detector is often sensitive to light outside the active area. The performance of a high speed detector may therefore be improved if the light is restricted to the active area because light incident on other areas of the detector typically creates electron hole pairs that take longer to reach the junction region, degrading the responsivity of the device. Therefore, when the photons are incident near the periphery of the effective active area of the photodetector, the response performance becomes poor and responsivity near the periphery of the effective active area of the photodetector is degraded relative to the responsivity near the center of the device.

Further, the depletion layer for a high speed photodetector is relatively thin, typically on the order of about 0.08–0.15 um for a 10 Gbps device. Therefore, when a non-uniform beam is focused or convergent on the photodetector surface, the depletion layer may not uniformly absorb the incident photons, wherein high power photons may propagate through the depletion layer without being completely absorbed. The reduced absorption levels may increase the bit error rate and reduce the responsivity of the device.

Figure 12:
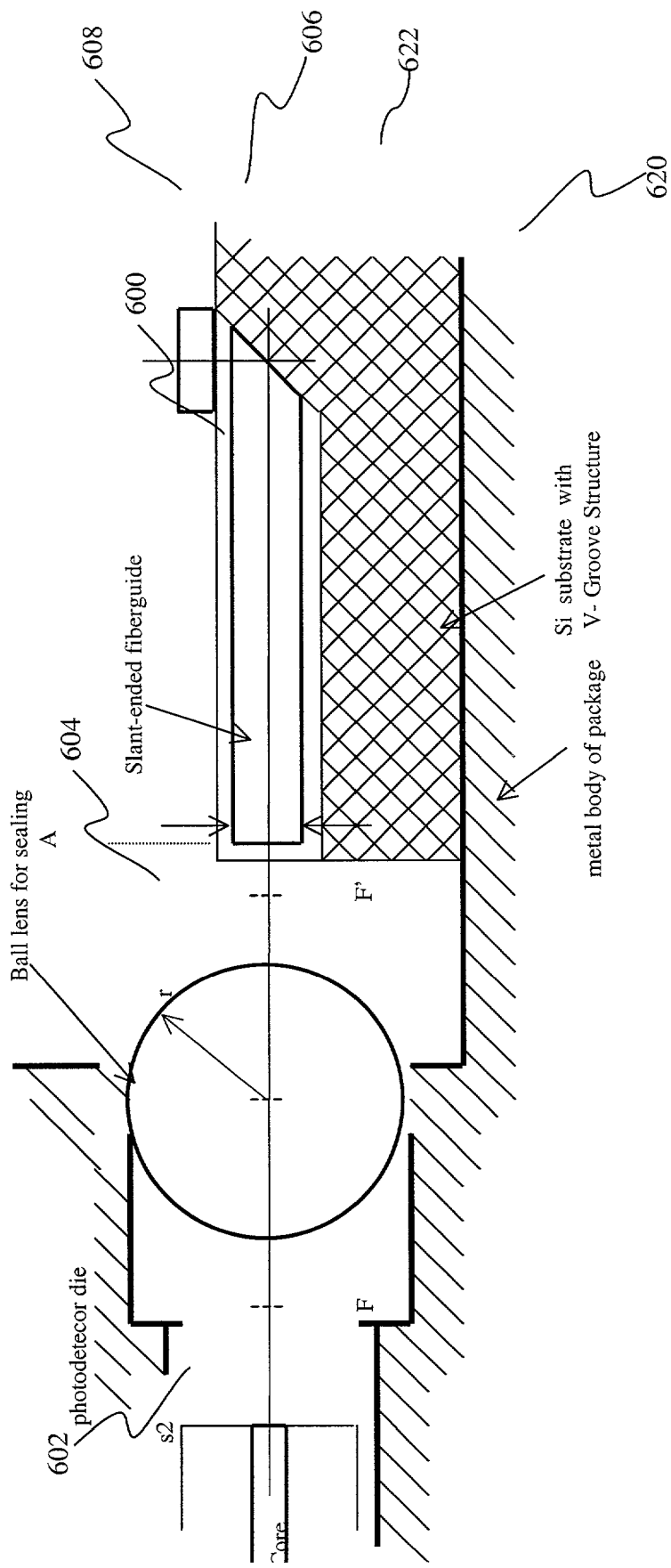
FIG. 12 is a cross section of a fiber to photodetector interface including a focusing system having a slant ended fiber guide for reflecting a uniformly reflecting a received beam onto a photodetector in accordance with an exemplary embodiment of the present invention.

Therefore, referring to FIG. 12, an alternate embodiment of the present invention may utilize a slant-ended fiber guide 600 in place of the reflecting surface and second lens utilized in conventional systems. The fiber guide may be a pure optical material, such as for example, glass, optical plastic, etc. wherein the environment surrounding the fiber guide (e.g. air having an index of refraction of approximately 1.0) functions as a cladding.

In operation, received light is emitted from the end face of an optical fiber 602 and focused by a lens 604 into the fiber guide 600. The fiber guide propagates a light beam in a manner that is similar to propagation in an optical fiber or waveguide channel. In the described embodiment an end face 606 of the distal end of the fiber guide 600 is non-perpendicular to the longitudinal axis defined by the fiber guide to reflect the beam onto a photodetector 608. As is known in the art the end face of the fiber guide may be cleaved or polished to provide the desired end face angle.

In accordance with the described exemplary alternate embodiment, a metal receiver housing 620 includes a hole for receiving the optical fiber 602. In one embodiment, the lens 604 may be a ball lens that is epoxy bonded to the receiver housing to provide a hermetic seal for the receiver package. In addition, the receiver housing 620 may include a substrate 622, such as for example a silicon substrate, that is adapted to retain the fiber guide 600 and to support the photodetector 608.

Figure 13:
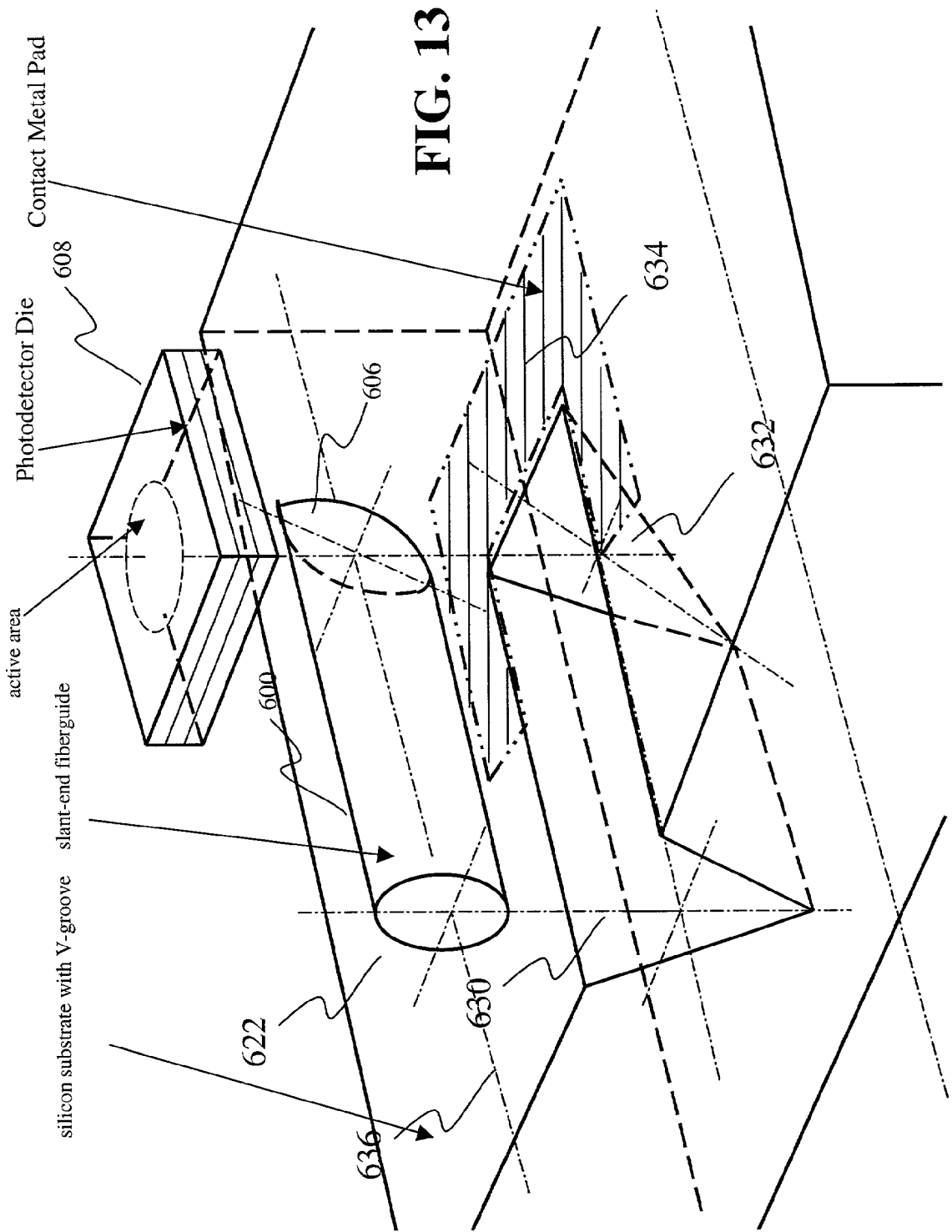
FIG. 13 is a perspective view of the fiber to photodetector interface of FIG. 12 wherein the interface housing includes a silicon substrate having a recess in the form of a v-groove that is adapted to retain the fiber guide in accordance with an exemplary embodiment of the present invention.

For example, referring to FIG. 13, the described exemplary silicon substrate may include a recess in the form of a v-groove 630 that is adapted to retain the fiber guide. In the described exemplary embodiment the end face of the fiber guide is slanted at an angle that is less than the critical angle for total internal reflection and is preferably in the range of about 40–55 degrees. The v-groove 630 in the substrate 622 may be terminated with a slanted plane 632. The angle of the slanted end plane 632 preferably matches the slant angle of the end face of the fiber guide so that the end face of the fiber guide butt fits against the slanted plane of the v-groove. The fiber guide may then be retained within the v-groove and aligned with the photodetector that is mounted on a metal contact pad 634 formed on a surface of the silicon substrate 622.

One of skill in the art will appreciate that reflections off the end face of the fiber guide create a divergent reflected beam whose width increases with increasing distance from the slanted end face 606. Therefore, for a fixed fiber guide diameter the described alternate receiver embodiment may uniformly illuminate a photodetector having a given active area diameter by adjusting the vertical separation between the photodetector and the slanted end face of the fiber guide. Advantageously, the vertical separation between the photodetector and the slanted end face of the fiber guide may be readily controlled by adjusting the height of the surface upon which the photodetector is mounted relative to the slanted termination plane of the v-groove.

Figure 14:
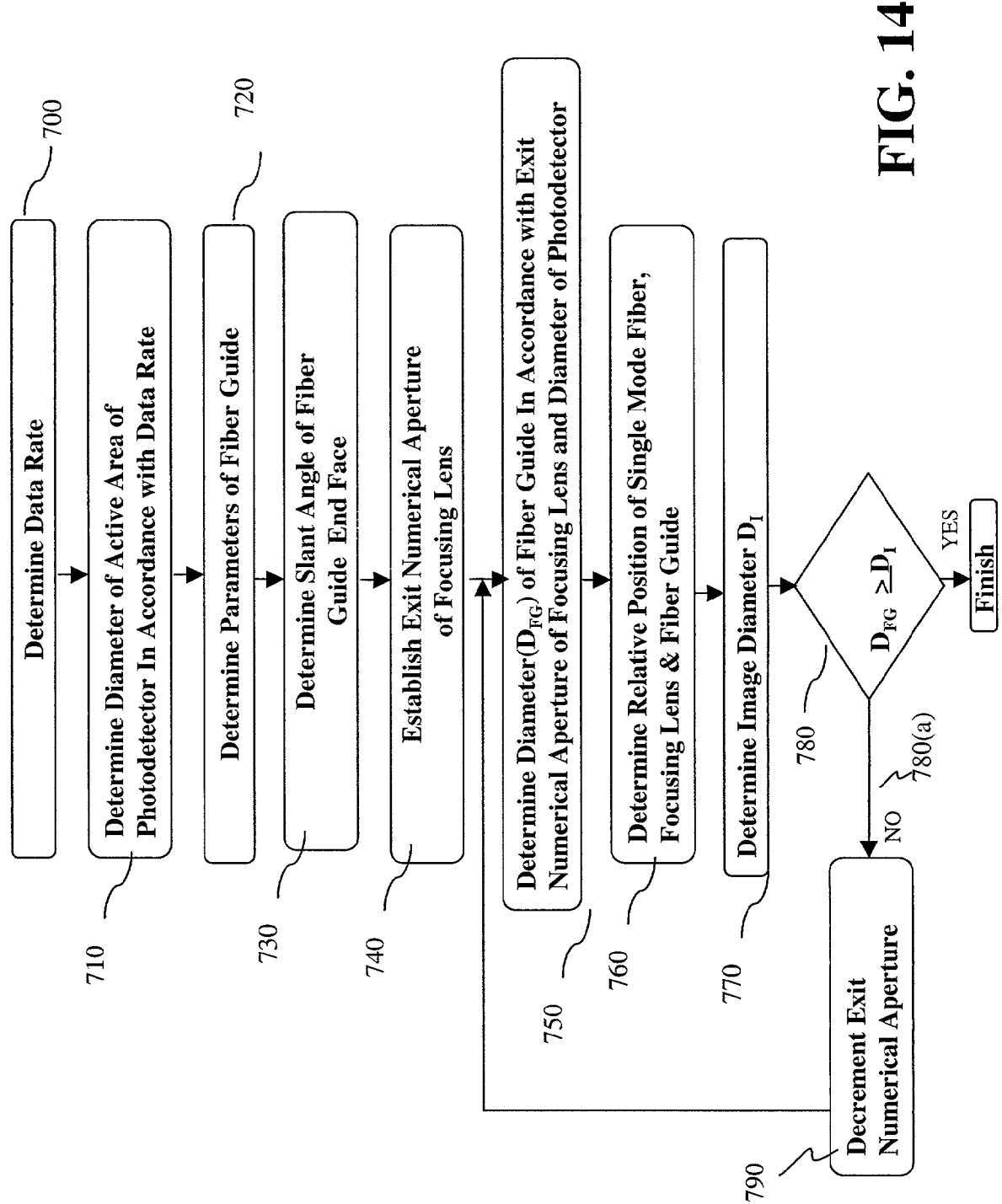
FIG. 14 is an exemplary process for designing the high speed optical interface illustrate in FIG. 12 in accordance with an exemplary embodiment of the present invention.

The design of a slant ended fiber guide optical receiver may proceed in accordance with the flow chart illustration shown in FIG. 14. To proceed, the initial design parameters including data rate are established 700. As previously described with respect to FIG. 7, the diameter of the active area of a photodetector may now be determined as a function of the desired data rate 710. Next, a user may specify fiber guide parameters, such as for example, the index of refraction of the fiber guide 720. The user may then determine the numerical aperture and critical angle for the specified parameters.

For example, in one embodiment the fiber guide may be a pure optical material, such as for example, glass, optical plastic, etc. with a refractive index on the order of about 1.52. In this instance the environment surrounding the fiber guide (e.g. air having an index of refraction of approximately 1.0) functions as a cladding. Therefore, the numerical aperture of the fiber guide may be calculated as follows:

$$NA_{FG} = sqrt[(n_{core})^2 - (n_{cladding})^2] 1.1447$$

In operation, reflections off the slanted end face of the fiber guide create a divergent reflected beam. In the described exemplary embodiment the end face of the fiber is slanted at an angle that is less than the critical angle for total internal reflection and is preferably in the range of about 40–55 degrees 730.

In addition, a user may also establish an entrance and exit numerical aperture for the focusing lens 740. A numerical aperture is a measure of the resolving power of a lens, and is a function of the lens geometry and the refractive index of the lens-space medium. In the described exemplary embodiment the exit numerical aperture of the ball lens is preferably chosen to be smaller than the numerical aperture of the fiber guide to promote efficient optical coupling between the ball lens and the fiber guide. In addition, for a spherical ball lens the entrance numerical aperture is equal to the exit numerical aperture. Therefore, the numerical aperture of the ball lens should also be chosen to be larger than the numerical aperture of the single mode optical fiber 740.

For example, the numerical aperture of a typical SMF-28 single mode fiber is on the order of about 0.14. Thus, in this example the numerical aperture of the ball lens should therefore be equal to or greater than about 0.14 and much less than 1.1447 the numerical aperture of the fiber guide.

In operation reflections off the end face of the fiber create a divergent reflected beam whose width increases with increasing distance from the slanted end face. As previously discussed with regard to FIGS. 4–6, the beam divergence is bound in large part by the maximum angle captured by the fiber guide as limited by the critical angle of the fiber guide or the refraction angles seen at the exit surface of the ball lens. The refraction angle seen at the exit surface of the ball lens is given by the inverse sine of the exit numerical aperture of the ball lens.

$$\text{Refraction Angle} = \sin^{-1}(NA_{Exit})$$
$$= \sin^{-1}(0.2) 11.85 \text{ degrees}$$

Referring to Eq. 4 below, assuming a 45 degree end face angle α, the diameter of the fiber guide may be sized in accordance with the diameter of the photodetector and the maximum propagation angle within the fiber guide. One of skill in the art will appreciate that the maximum propagation angle may be determined either by the critical angle of the fiber guide or more likely by the refraction angle seen at the exit surface of the ball lens.

$$D_{photodetector} = D_{fiberguide}/\tan\{180-(\beta+\alpha)-\beta\} + D_{fiberguide} \quad (\text{Eq. 4})$$

For example, referring back to FIG. 7, the active area diameter of a 10 Gbps photodetector, for example, may be on the order of about 25–35 μm depending on the manufacturing process used to produce the device. For purposes of illustration it is assumed that the exit numerical aperture of the ball lens is 0.2 and the refraction angle seen at the exit surface determines the maximum propagation angle within the fiber guide and is approximately 11.85°. Therefore, in this embodiment, the diameter of the fiber guide may be determined as follows:

$$35 \text{ μm} = D_{fiberguide}/\tan\{180-(56.85)-45\} + D_{fiberguide}$$

$$35 \text{ μm} = D_{fiberguide}/4.76 + D_{fiberguide}$$

$$29.16 \text{ μm} = D_{fiberguide}$$

One of skill in the art will appreciate that if desired the fiber guide may be coated with a reflective coating to ensure total internal reflection of the rays propagating within the fiber guide.

Figure 15:
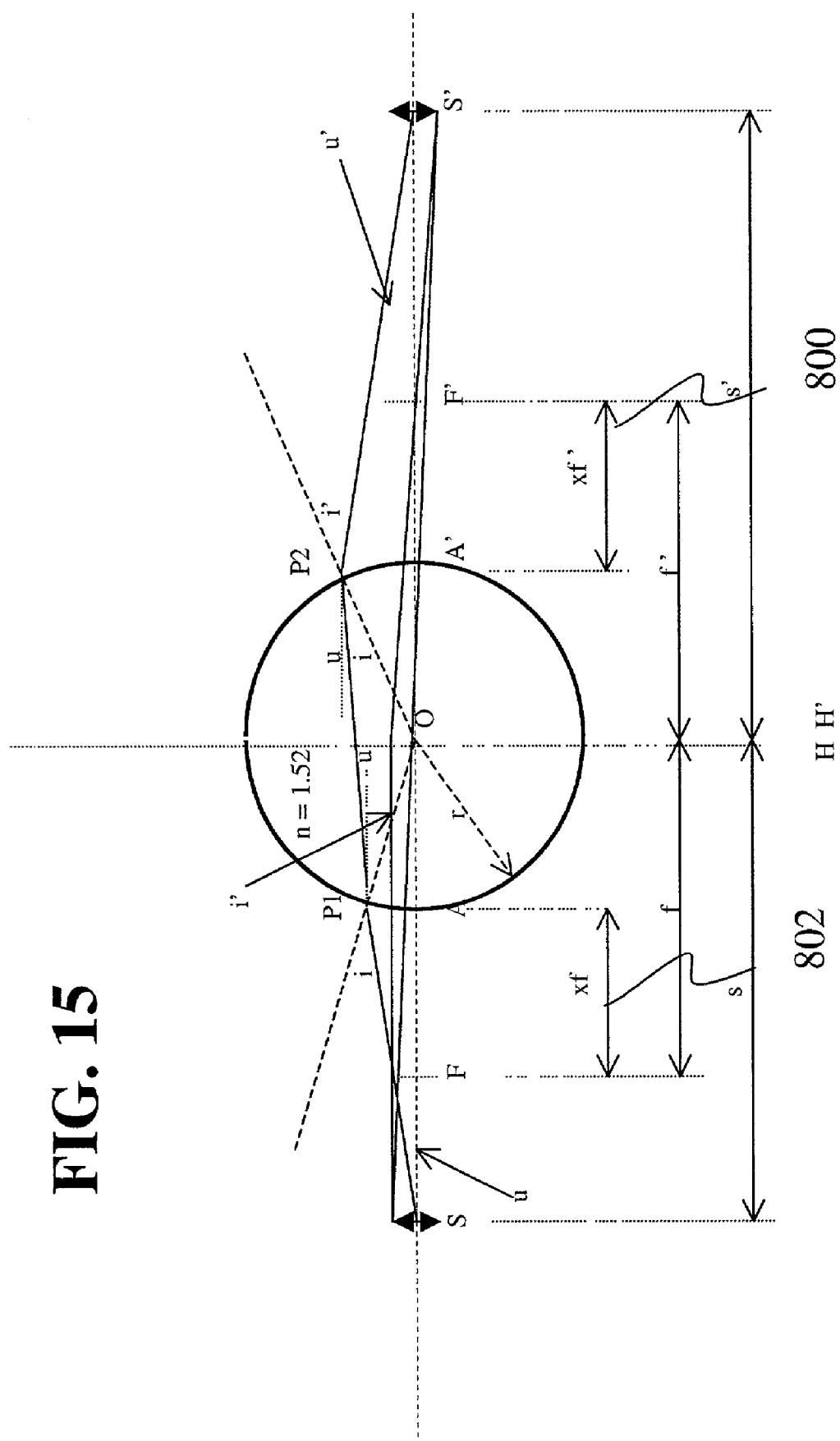
FIG. 15 is a cross section illustrating additional details of the focusing system illustrated in FIG. 12 in accordance with an exemplary embodiment of the present invention.

Referring to FIG. 15, having determined the diameter of the active area of the photodetector in accordance with the data rate and the corresponding diameter of the fiber guide, the focusing system may be further developed to provide an appropriate lateral magnification to ensure the image of the core of the single mode fiber is efficiently coupled into the fiber guide.

One of skill in the art will appreciate that the lateral magnification and actual image height at the entrance of the fiber guide may now be determined in accordance with a plurality of techniques 770. For example, standardized ray tracing programs that include the affects of spherical aberrations may be used to calculate the size of the actual image at the fiber guide entrance. Alternatively, the size of the image may also be estimated in accordance with para-axial theory and the primary aberration approach as follows:

$$\text{Image} = 2*(\text{lateral } SA + y')$$

where SA is the spherical aberration and y' is the lateral magnification.

The lateral magnification may be determined in accordance with the Lagrange Invariant as follows:

$$J = n*u*y = n'*u'*y'$$

where in this case, n=1.0 and n'=1.0 (both sides of the ball lens are bounded by air), so that u*y=u'*y' where u is the object exit NA, u' is the image entrance NA, y is the object height (nine microns total in this example), y' is the image height, i is the incident angle in the $1^{st}$ medium and i' is the refraction angle in the $2^{nd}$ medium.

In this example the amplification may therefore be calculated as follows y'/y=u/u' or from the geometrical trace as M=s'/s, where s' and s are the lateral distances between the ball lens and the entrance of the fiber guide and exit of the single mode fiber respectively. In addition, for a spherical focusing lens the object principal plane is overlapped with the image principal plane so that the amplification may also be defined as M=y'/y.

Further, in the described exemplary embodiment the object and image are located in air so that n=1.0 and n'=1.0 and the magnification may also be determined in accordance with the ratio of the image numerical aperture and the numerical aperture of the lens (i.e. M=u/u'). The numerical aperture of a typical SMF-28 single mode fiber is on the order of about 0.14 so that the amplification factor for a sphere having an exit numerical aperture of 0.2 is given by:

$$y' = y*u/u' = 4.5 \text{ um}*0.14/0.2 = 3.14 \text{ um},$$

$$M = u/u' = 0.14/0.2 = 0.7$$

In addition, the lateral location of the end face of the single mode fiber relative to the focusing lens as well as the lateral location of the focusing lens relative to the entrance plane of the fiber guide may initially be determined 760. In the described alternate embodiment the entry point of the fiber guide is preferably located at or near the back focal point of the ball lens, allowing the narrowly focused beam to be efficiently captured by the fiber guide. The lateral location of the fiber guide entrance relative to the exit of the ball lens 800 (s') may be determined as follows:

$$s' = r * i'/u'$$
$$= 750 \text{ um} * 0.573576436/0.2 = 2150.911635 \text{ um}$$

where for purposes of illustration r, the radius of the sphere, is assumed to be 750 um and i' the sphere refraction angle is assumed to be sin(35°) or approximately 0.57.

Further the lateral location of the end face of the single mode fiber relative to the entrance of the ball lens 802 may determined as follows:

$$s = s'/M = 2150.911635/0.7 = 3072.730907 \text{ um}$$

Further, the lateral spherical aberration may be determined as follows:

$$\text{lateral } SA = |\text{axial } SA| * u'_k/(4*2)$$

where the axial spherical aberration may be calculated as follows:

$$\text{axial } SA = -1/(2*n'_k * u'_k * u'_k) * \sum_{1}^{k} S_I$$

where $\Sigma S_I$ is the primary Seidel Sum given by SI=s*u*n*i*(i–i')*(i'–u), and k is two indicating either the entrance or exit interface. For purposes of illustration it may be assumed that the ball lens has an index of refraction of 1.52 and axial spherical aberration may be approximated by:

$$\text{axial } SA = -1/(2*n' * u' * u') * \sum_{1}^{k} S_I$$
$$= -1/(2*1.0*0.2*0.2)*(11.49 + 9.28)$$
$$= 259.695 \text{ um}$$

so that the lateral spherical aberration may be approximated by:

$$\text{lateral } SA = |\text{axial } SA| * u'_k / (4 * 1.41415926)$$
$$= 259.695 * 0.2/5.65685 = 9.181628255$$

Finally the diameter of the image of the 9.0 um core of the single mode optical fiber core at the entrance of the fiber guide may be approximated as:

$$\text{Image} = 2 * (\text{lateral } SA + y')$$
$$= 2 * (9.181628255 + 3.14)$$
$$= 24.632 \text{ um}$$

Thus the fiber core image may be focused into the 29 um diameter fiber guide in the 10 Gbps example. However, if the diameter of the fiber guide is not equal to or greater than the diameter of the image 780(*a*) the described exemplary embodiment may decrement the numerical aperture of the focusing lens 790. The fiber guide diameter and parameters may again be calculated until the diameter of the fiber guide is equal to or greater than the diameter of the image at the entrance to the fiber guide to ensure high optical coupling there between.

As previously discussed the diameter of the active area of the photodetector decreases with increasing data rate. Therefore, the acceptable range of fiber guide diameters will also decrease with increasing data rate. One of skill in the art will appreciate that for higher data rate applications, such as for example, 40 Gbps applications, an aspherical focusing lens having a reduced lateral spherical aberration (e.g. in the range of about one micron) may be used to reduce the diameter of the image at the entrance to the fiber guide. The reduced image allows the fiber guide diameter to be sized in accordance with the smaller active area of the photodetector.

Alternatively, the fiber guide diameter may taper over the lateral length of the fiber guide. For example, for high speed applications, the fiber guide diameter may taper from a larger entrance diameter that may be required to efficiently capture the image of the core of the single mode optical fiber to a lower diameter that may be preferable for uniformly illuminating the active area of a high speed device.

Although exemplary embodiments of the present invention have been described, they should not be construed to limit the scope of the present invention. Those skilled in the art will understand that various modifications may be made to the described embodiments. For example, the present invention is not limited to optical receiver applications. Rather the present invention may be utilized to provide a high speed optical interface for an optical transmitter or transceiver module.

Light transmitted by fiber optic cables is, in most instances, produced by a light emitting semiconductor device which is optically coupled to an end face of a fiber optic cable. For example, edge emitting lasers that emit light from a polished or cleaved end surface have played a significant role in optical communication due to their high operating efficiency and modulation capabilities. More recently there has been interest in a new type of light emitting device called vertical cavity surface emitting lasers (VCSELs). A principal characteristic of a VCSEL is that it emits beams vertically, i.e. in a direction normal to the p-n junction of the semiconductor wafer from which it was fabricated.

Advantageously, the far field divergence angle of a VCSEL, typically in the range of about 5–15 degrees is significantly smaller than the far field output beam of an edge emitter which is asymmetric and typically ranges from about 20–40 degrees. Therefore, VCSELs typically provide a smaller diameter output beam that may be more readily coupled into a given diameter optical waveguide.

In fiber optic systems and certain other applications, an optical transmitter such as a VCSEL is often housed in an optical subassembly that couples the device to an optical waveguide. However, as normally installed, the output beam of a VCSEL, is perpendicular to the axis of propagation of the optical waveguide which typically lies in the plane of the circuit board to which the VCSEL is coupled. Therefore, a lead forming process is typically performed on the optical subassembly header pins to place the output surface of the VCSEL substantially into parallel alignment with end face of the optical fiber.

As a result, conventional packaging techniques may incur excessive labor costs for what is typically a manual assembly process (i.e. manual lead forming and manual soldering of OSAs onto a substrate). In addition, a focusing lens may often be included in a conventional package to efficiently focus the divergent laser output beam onto the end face of the fiber. The utilization of additional external optical components may further increase the cost of a conventional optical subassembly.

Therefore, an exemplary embodiment of the present invention provides an interface between an optical waveguide and optoelectronic transmitter that does not require labor intensive lead forming or external optical focusing components. For example, referring to FIG. 16, in an exemplary embodiment of a present invention an optoelectronic transmitter 1400, such as, for example, a VCSEL or edge emitting laser, may be butt coupled to a slant end optical waveguide 1450 (such as, for example, a SMF-28 optical fiber).

An end face 1420 of a distal end of the optical fiber 1450 is non-perpendicular to the longitudinal axis defined by the fiber core 1440. That is to say, the end face 1420 of the optical fiber 1450 is slanted. As is known in the art the end face of the fiber may be cleaved or polished to provide a desired end face angle. In the described exemplary embodiment the end face of the fiber is slanted at an angle that is less than the critical angle for total internal reflection and may be in the range of about 40–55 degrees.

In operation the optoelectronic transmitter outputs a divergent Gaussian shaped optical beam. In practice, the irradiance of a Gaussian beam is symmetric about the beam axis and varies with radial distance (r) from the axis as provided in Eq. 5.

$$I(r) = I_0 \exp(-2r^2/\omega_0^2) \quad (5)$$

where $\omega_0$, usually called the Gaussian beam radius, is the radius at which the intensity has decreased to $1/e^2$ or 0.135 of its value on the axis. A Gaussian beam has a waist, where $\omega_0$ is smallest and diverges from that point in accordance with the far field divergence angle, which is the angle $\theta$ subtended by the $1/e^2$ diameter points for distances far from the beam waist. The axial location of the beam waist may be characterized by the Raleigh range ($Z_r$) which is the distance from the beam waist where the beam diameter has increased by a factor of the square root of two times the beam waist ($\sqrt{2}\omega_0$) as provided in Eq. 6.

$$Zr = \frac{\omega_0}{\theta} = \frac{\pi \omega_0^2}{4\lambda} \quad (6)$$

In the far field the diameter of a Gaussian beam increases proportionally to the distance (Z) away from the beam waist. The diameter of the incident beam (i.e. the transmitter output beam incident upon the fiber end face) therefore increases with increasing distance from the optoelectronic transmitter. However, for efficient optical coupling, the diameter of the slant ended fiber core is preferably equal to or greater than the diameter of the incident beam.

Thus, the butt coupling efficiency between an optoelectronic transmitter and a slant ended fiber decreases with increasing separation distance between the end face of the fiber core and the optoelectronic device. Therefore, an exemplary embodiment of the present invention may reduce the thickness of the fiber cladding 1410 between the laser front facet 1480 and the end face 1420 of the fiber core 1440 to improve the coupling efficiency therebetween.

For example, the irradiance distribution of a Gaussian beam may be characterized in terms of the beam waist $\omega_0$, the Raleigh range ($Z_r$), the radial distance from the beam axis (r) and the distance from the beam waist (z) as illustrated in Eq. 7.

$$I(r, Z) = \frac{I_0 e^{\left(\frac{-2(r/w0)^2}{1+\left(\frac{Z}{Z_r}\right)^2}\right)}}{1+\left(\frac{Z}{Z_r}\right)^2} \quad (7)$$

Figure 17:
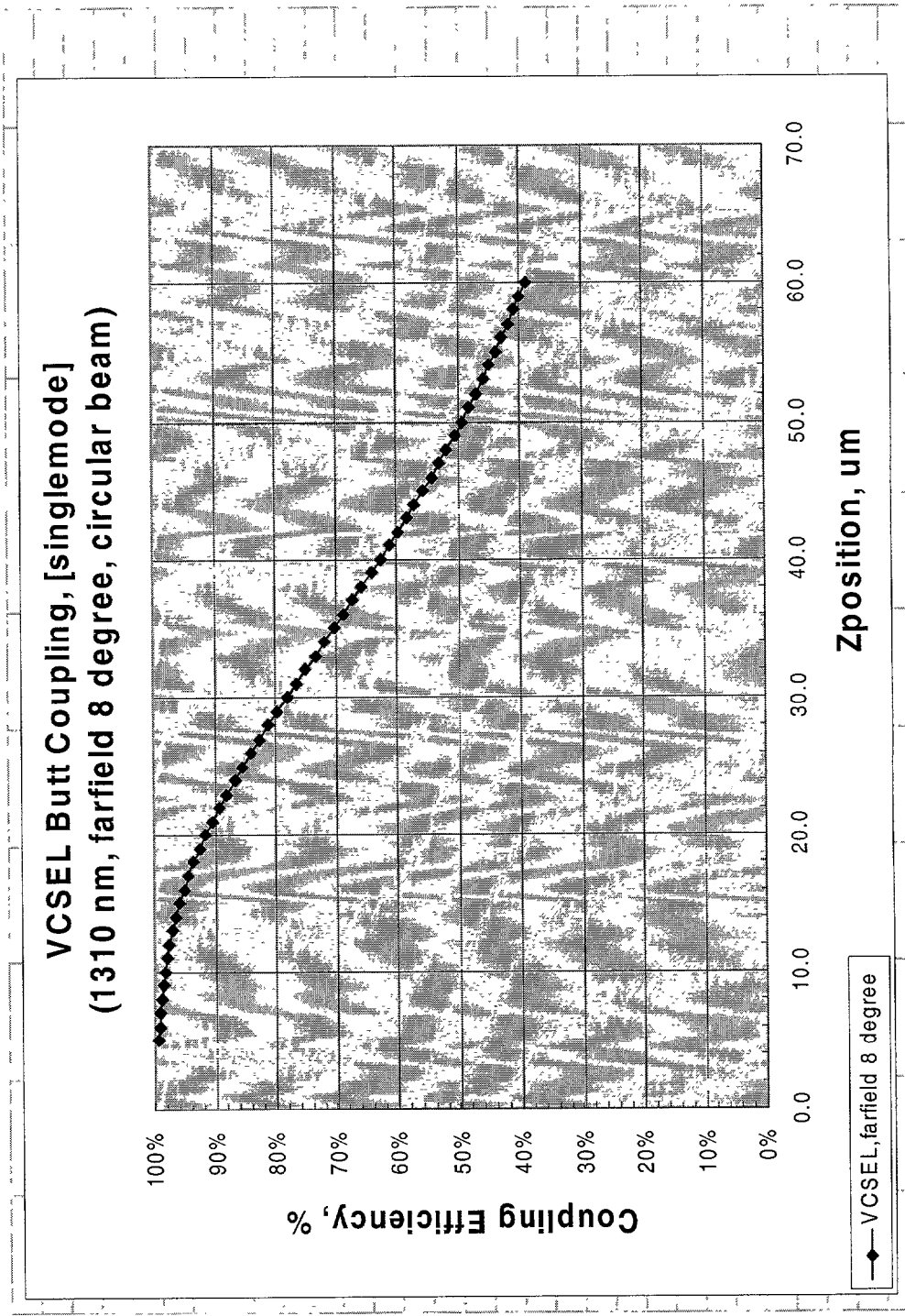
FIG. 17 is a graphical illustration of the coupling efficiency of a VCSEL into a slant ended fiber guide as a function of the separation distance between the VCSEL and the fiber end face in accordance with an exemplary embodiment of the present invention.

The butt coupling efficiency of a VCSEL with an optical fiber can therefore be characterized as a function of the distance between the end face of the fiber core and the optoelectronic device. For example, FIG. 17 graphically illustrates the butt coupling efficiency between a VCSEL having a single mode aperture of 5.817 μm (set equal to the beam waist) and a full far field divergence angle of sixteen degrees, and an optical fiber having a 9 μm fiber core at a wavelength of 1310 nm as a function of the distance between the end face of the fiber core and the optoelectronic device. Assuming perfect optical alignment, a coupling efficiency in the range of about 92~94% may be achieved for a separation distance in the range of about 3~5 um. On the other hand the coupling efficiency for a standard fiber having a cladding thickness of 58 um is less than about 40%.

Figure 16:
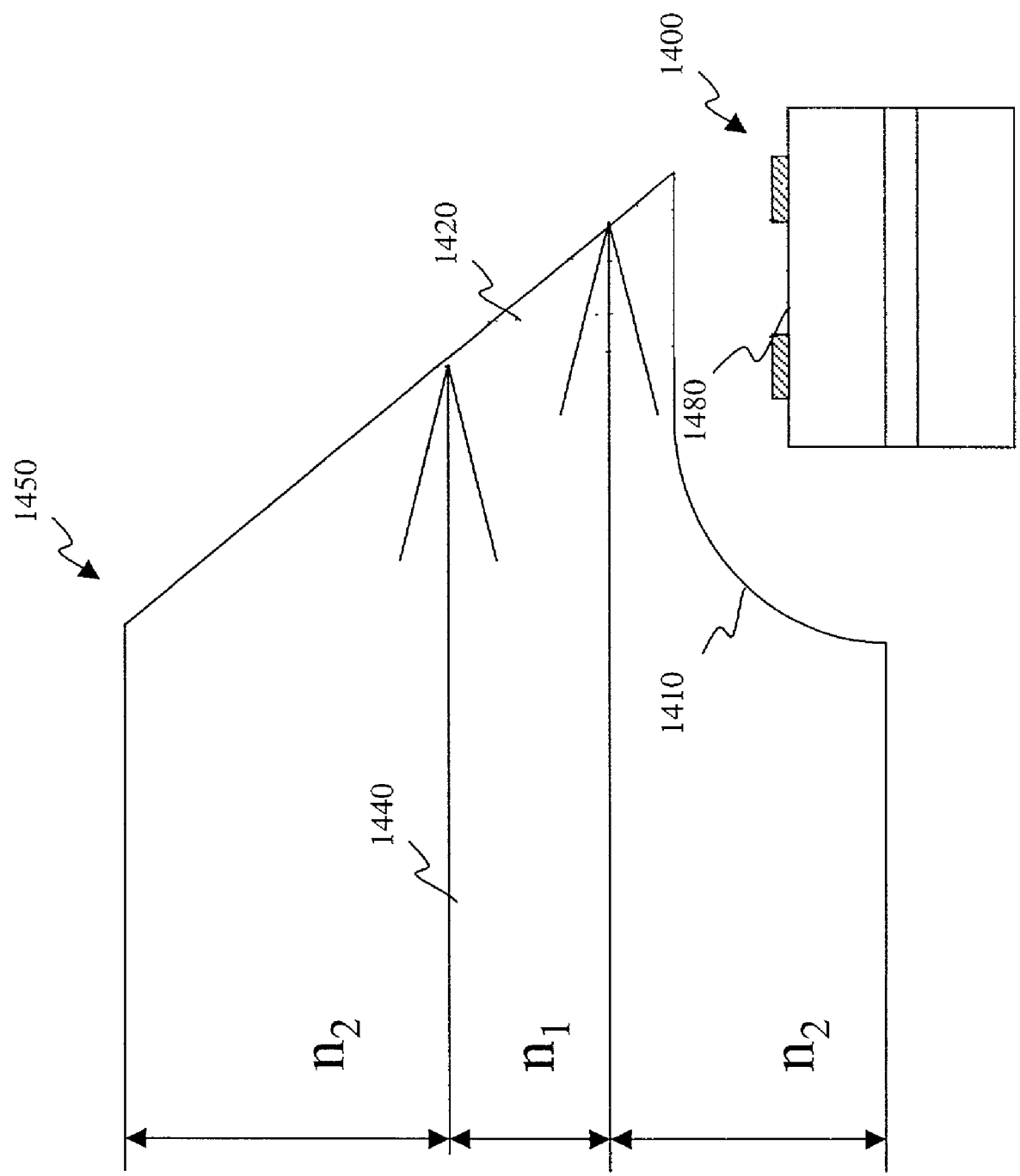
FIG. 16 is a cross section of a VCSEL interfaced with a slanted ended optical fiber wherein a portion of the fiber cladding between the VCSEL and the fiber core has been removed to allow the VCSEL to be more closely coupled to the slanted fiber end face in accordance with an exemplary embodiment of the present invention.

Referring back to the cross section of FIG. 16, in an exemplary embodiment of the present invention the fiber cladding 1410 on the entrance side of the slant ended fiber 1450 may be polished, laser ablated or chemically etched to reduce the thickness of the cladding material. The reduced cladding thickness allows the optoelectronic device to be more closely coupled to the fiber core which reduces the beamwidth of the divergent beam that is incident on the end face of the fiber, improving the coupling efficiency into the fiber.

One of skill in the art will appreciate that the present invention is not limited to VCSEL transmitters. Rather the described exemplary slant ended fiber having a reduced cladding thickness may also be coupled with an edge emitting laser. However, the wider, asymmetric far field divergence angle of typical edge emitters may result in a lower coupling efficiency for edge emitters as compared to typical VCSELs.

In the case of edge emitters a coupling efficiency in the range of 11–13% may be achieved for a separation distance in the range of 6–10 um corresponding to a cladding thickness in the range of about 1–5 um. On the other hand the coupling efficiency between an edge emitter and a standard fiber having a cladding thickness of 58 um is less than about 5%.

Although exemplary embodiments have been described, they should not be construed to limit the scope of the appended claims. Those skilled in the art will understand that various modifications may be made to the described embodiment. For example, light emitting devices such as vertical cavity surface emitting lasers (VCSELs) are often manufactured in the form of arrays, wherein the devices are epitaxially grown on a single substrate, processed and auto-tested as a whole wafer. The present invention provides a relatively high density interface between an array of optoelectronic devices with an array of optical fibers.

Figure 18:
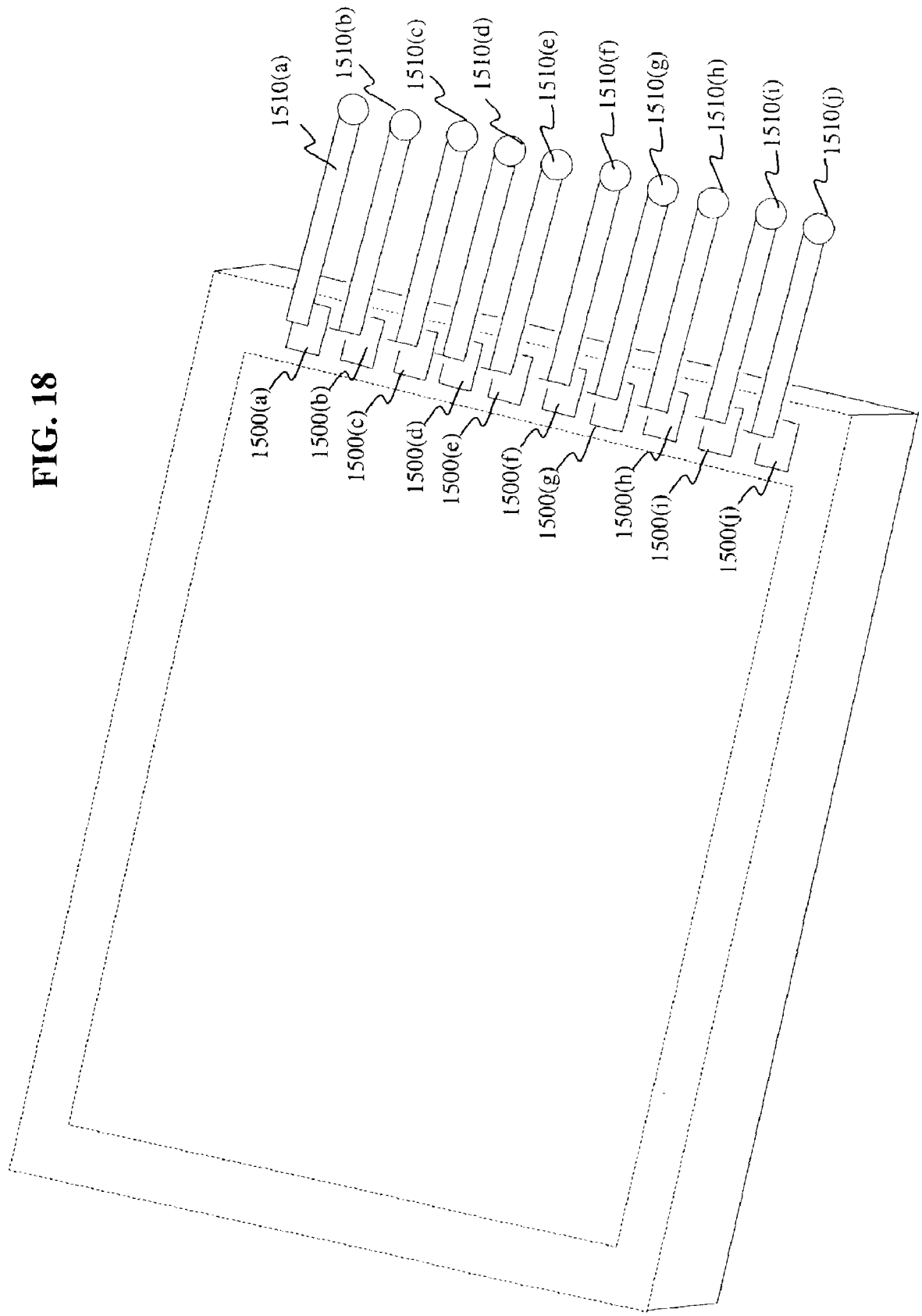
FIG. 18 is a perspective view of a linear array of optoelectronic devices interfaced with an array of optical fibers in accordance with an exemplary embodiment of the present invention.

For example, FIG. 18 illustrates a linear array of optoelectronic devices 1500(a–j) interfaced with an array of optical fibers 1510(a–j). The optoelectronic devices may comprise an array of transmitters, such as for example, VCSELs or edge emitting lasers, or may comprise an array of transceivers, each comprising a VCSEL and photodetector monolithically formed on a common substrate. In this embodiment, each of the optoelectronic transmitters may interface with a slant ended fiber as illustrated in FIG. 16 and each of the photodetectors may interface with a slant ended fiber as illustrated in FIG. 5a.

The invention described herein will itself suggest to those skilled in the various arts, alternate embodiments and solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

What is claimed is:

1. An optoelectronic subassembly, comprising:
   an optical fiber comprising a fiber cladding surrounding a fiber core; and
   an optoelectronic device optically coupled to a distal end on a side of said optical fiber, wherein a first portion of said fiber cladding on said side to which said optical device is optically coupled has a first thickness, and wherein a second portion of said fiber cladding on said side to which said optical device is optically coupled has a second thickness, said second thickness being less than said first thickness.

2. The optoelectronic subassembly of claim 1 wherein said distal end comprises a slanted end face, and wherein an angle of said slanted end face is in a range of about 45–55 degrees.

3. The optoelectronic subassembly of claim 1 wherein said second thickness is in a range of about 1–5 µm.

4. The optoelectronic subassembly of claim 1 wherein said optoelectronic device comprises a optoelectronic transmitter.

5. The optoelectronic subassembly of claim 4 wherein said optoelectronic transmitter comprises a VCSEL (vertical cavity surface emitting laser).

6. The optoelectronic subassembly of claim 4 wherein said optoelectronic transmitter comprises an edge emitter.

7. The optoelectronic subassembly of claim 1 wherein said optoelectronic device comprises a optoelectronic transceiver having a optoelectronic transmitter and an optoelectronic receiver.

8. The optoelectronic subassembly of claim 1 wherein said optoelectronic device is mounted in a housing and wherein said housing is adapted to receive said distal end of said optical fiber.

9. The optical receiver of claim 8 wherein said housing comprises a hermetically sealed housing.

10. An optoelectronic subassembly, comprising:
    a plurality of optical fibers, wherein each of said optical fibers comprises a fiber cladding surrounding a fiber core; and
    a plurality of optoelectronic devices, wherein each of said plurality of optoelectronic devices is optically coupled to a distal end on a side of a unique one of said plurality of optical fibers, wherein a first portion of said fiber cladding of each of said plurality of optical fibers on said sides to which said optical devices are optically coupled has a first thickness, and wherein a second portion of said fiber cladding on said sides to which said optical devices are optically coupled has a second thickness, said second thickness being less than said first thickness.

11. The optoelectronic subassembly of claim 10 wherein each of said distal ends comprise a slanted end face, and wherein an angle of each of said plurality of slanted end faces is in a range of about 45–55 degrees.

12. The optoelectronic subassembly of claim 10 wherein said second thickness is in a range of about 1–5 µm.

13. The optoelectronic subassembly of claim 10 wherein said plurality of optoelectronic devices comprises a plurality of optoelectronic transmitters.

14. The optoelectronic subassembly of claim 13 wherein said plurality of optoelectronic transmitters comprises a plurality of vertical cavity surface emitting lasers (VCSELs).

15. The optoelectronic subassembly of claim 13 wherein said plurality of optoelectronic transmitters comprises a plurality of edge emitters.

16. The optoelectronic subassembly of claim 10 wherein said plurality of optoelectronic devices comprises a plurality of optoelectronic transceivers, wherein each of said plurality of optoelectronic transceivers comprises an optoelectronic transmitter and an optoelectronic receiver.

17. The optoelectronic subassembly of claim 10 wherein said plurality of optoelectronic devices are mounted in a housing and wherein said housing is adapted to receive said distal end of said plurality of optical fibers.

18. The optical receiver of claim 17 wherein said housing comprises a hermetically sealed housing.

19. The optoelectronic subassembly of claim 1 wherein said optoelectronic device comprises an optoelectronic receiver.

20. The optoelectronic subassembly of claim 10 wherein said plurality of optoelectronic devices comprises a plurality of optoelectronic receivers.

21. An optoelectronic subassembly, comprising:
    an optical fiber comprising a fiber cladding surrounding a fiber core which defines a longitudinal axis of the optical fiber, the optical fiber including a distal end; and
    an optoelectronic device optically coupled to the distal end on a side of the optical fiber,
    wherein a first portion of the fiber cladding on said side to which said optical device is optically coupled has a first thickness, and
    wherein a second portion of the fiber cladding on said side to which said optical device is optically coupled has a second thickness which is less than the first thickness.

22. The optoelectronic subassembly of claim 21, wherein an optical signal enters or exits the optical fiber through the second portion having the second thickness.

23. The optoelectronic subassembly of claim 22, wherein the optical signal is propagated in a direction which is substantially normal to the longitudinal axis of the optical fiber.

24. The optoelectronic subassembly of claim 21, wherein the second portion having the second thickness is formed by reducing the thickness of the fiber cladding through polishing, laser ablating or chemical etching.

* * * * *